(12) United States Patent
Petersen et al.

(10) Patent No.: US 12,261,439 B1
(45) Date of Patent: Mar. 25, 2025

(54) METHOD FOR DAMPING POWER OSCILLATION IN AN ELECTRIC POWER GRID

(71) Applicant: VESTAS WIND SYSTEMS A/S, Aarhus (DK)

(72) Inventors: Lennart Petersen, Skødstrup (DK); Torsten Lund, Fredericia (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/797,430

(22) Filed: Aug. 7, 2024

(30) Foreign Application Priority Data

Dec. 11, 2023 (DK) .................................. 2023 30391

(51) Int. Cl.
*H02J 3/24* (2006.01)
*H02J 3/38* (2006.01)

(52) U.S. Cl.
CPC .............. *H02J 3/241* (2020.01); *H02J 3/381* (2013.01); *H02J 2300/28* (2020.01)

(58) Field of Classification Search
CPC ...... H02J 3/18; H02J 3/24; H02J 3/381; H02J 2300/28
USPC ....................................................... 307/102
See application file for complete search history.

(56) References Cited

U.S. PATENT DOCUMENTS 9,528,499 B2 * 12/2016 Knuppel et al. ........ H02J 3/241
9,859,828 B2 * 1/2018 Tarnowski ................ H02J 3/28
11,990,755 B2 * 5/2024 Nielsen .................. G01R 19/04
2013/0175871 A1 7/2013 Knuppel et al.
2018/0138709 A1 5/2018 Hamann
2023/0344231 A1 10/2023 Nielsen et al.

FOREIGN PATENT DOCUMENTS

WO 2014121794 A1 8/2014

OTHER PUBLICATIONS

Danish Patent and Trademark Office, 1st Technical Examination including the Search Report for Application PA 2023 30391 dated Jun. 28, 2024.

* cited by examiner

*Primary Examiner* — Hal Kaplan
(74) *Attorney, Agent, or Firm* — Patterson + Sheridan, LLP

(57) ABSTRACT

A method for damping power oscillation in an electric power grid, comprising: performing a procedure for determination of a phase shift between a filtered voltage signal and a filtered frequency signal; based on the performed procedure, determining which one of the filtered voltage signal and filtered frequency signal is leading or lagging in relation to the other one of the filtered voltage signal and filtered frequency signal; based on the determination of which one of the filtered voltage signal and filtered frequency signal is leading or lagging, setting a gain of a power oscillation damping controller to be positive or negative; applying the power oscillation damping controller with the set gain so as to produce an output signal outputted from the power oscillation damping controller; and based on the produced output signal, controlling an injection of electric power to the grid so as to dampen power oscillation in the grid.

15 Claims, 19 Drawing Sheets

METHOD FOR DAMPING POWER OSCILLATION IN AN ELECTRIC POWER GRID

TECHNICAL FIELD

Aspects of the present invention relate to a method for damping power oscillation in an electric power grid.

BACKGROUND

In general, an electric power grid based on synchronous generators and alternating voltage, for example referred to as a utility grid, may have defined parameters, for example a defined alternating voltage frequency, such as 50 Hz or 60 Hz. The stability of the electric power grid parameters, including the load angle of synchronous generators, is dependent on a variety of variables including the balance between generated electric power and consumed electric power in the electric power grid. In general, any imbalance between generated electric power and consumed electric power results in changes in the grid frequency of the electric power grid. In general, it is important to have a stable grid frequency in the electric power grid.

Further, power oscillation, or electromechanical oscillation of the load angle of synchronous generators, in general referred to as inter area oscillation, may occur in the electric power grid, which in general has a negative impact on the stability of the electric power grid parameters.

In general, a grid code may be specified for an electric power grid, for example by the electric power grid operator, wherein the grid code defines parameters a power plant connected to the electric power grid has to meet, such as a power plant including one or more wind turbine generators, for example to provide sufficient frequency support to the electric power grid, to provide sufficient voltage support to the electric power grid, or to provide sufficient power oscillation damping (POD) support (or contribution) to the electric power grid.

SUMMARY

The inventors of the present invention have found drawbacks in conventional solutions for damping power oscillation in electric power grids so as to provide power oscillation damping support to the electric power grid. For example, some conventional solutions do not provide a sufficiently efficient damping of power oscillation in electric power grids.

An object of the invention is to provide a solution which mitigates or solves the drawbacks and problems of conventional solutions.

The above and further objects are solved by the subject matter of the independent claims. Further advantageous embodiments of the invention can be found in the dependent claims.

According to a first aspect of the invention, the above mentioned and other objects are achieved with a method for damping power oscillation in an electric power grid, wherein the method comprises:

performing a procedure for determination of a phase shift between a filtered voltage signal and a filtered frequency signal, wherein the filtered voltage signal and the filtered frequency signal are associated with oscillation signals associated with the electric power grid and measured at a point of interest;

based on the performed procedure, determining which one of the filtered voltage signal and filtered frequency signal is leading or lagging in relation to the other one of the filtered voltage signal and filtered frequency signal;

based on the determination of which one of the filtered voltage signal and filtered frequency signal is leading or lagging in relation to the other one of the filtered voltage signal and filtered frequency signal, setting a gain of a power oscillation damping controller to be positive or negative, wherein a power oscillation damping controller is configured to receive an input signal and output an output signal;

applying the power oscillation damping controller with the set gain so as to produce an output signal outputted from the power oscillation damping controller; and based on the produced output signal, controlling an injection of electric power to the electric power grid so as to dampen power oscillation in the electric power grid.

For some embodiments, the filtered voltage signal may represent a filtered voltage magnitude signal, for example originating from a voltage signal, or a voltage magnitude signal, measured at the point of interest and thereafter filtered into the filtered voltage signal. For some embodiments, the filtered frequency signal may originate from a voltage signal and/or may represent a frequency of a voltage signal measured at the point of interest, which is thereafter filtered into the filtered frequency signal.

For some embodiments, the point of interest may correspond to, or be located at, the point of common coupling, PCC, via which a power plant is connected, or connectable, to an electric power grid. The point of common coupling may be referred to as the point of grid connection or grid interconnection. For some embodiments, the point of interest may correspond to, or be, a point of measurement. For some embodiments, the point of interest may be located elsewhere. For some embodiments, the step of controlling an injection of electric power to the electric power grid may comprise controlling a provision of electric power to the electric power grid.

An advantage of the method according to the first aspect is that an improved damping of power oscillation in electric power grids is provided. An advantage of the method according to the first aspect is that a fast damping of power oscillation in electric power grids is provided in relation to conventional solutions. An advantage of the method according to the first aspect is that an adequate and effective damping of power oscillation in electric power grids is provided.

An advantage of the method according to the first aspect is that the robustness of a power oscillation damping controller is improved. An advantage of the method according to the first aspect is that there is no need, or less need, for manual adjustments of particular configuration parameters, for example of a power oscillation damping controller, during various operational scenarios in the electric power grid, which may be needed for conventional solutions. The conditions of the electric power grid may change frequently, even several times during the course of a day, for example every hour. Additional work, for a transmission system operator (TSO), such as the operator of the electric power grid, or a power plant operator, for the manual adjustment of parameters of a power oscillation damping controller can be avoided by way of the method according to the first aspect. Further advantages emerge from the detailed description hereinbelow.

According to an advantageous embodiment of the method according to the first aspect, the method further comprises: receiving a frequency signal associated with the electric power grid as input signal to the power oscillation damping controller. An advantage of this embodiment is a further improved damping of power oscillation in electric power grids. An advantage of using a frequency signal as input signal to a power oscillation damping controller is that the frequency signal, such as the grid frequency, is less distorted compared to a voltage signal, which may be distorted by voltage controllers in the vicinity. However, when a frequency signal is used as input signal to the power oscillation damping controller, the sign of the gain of a power oscillation damping controller needs adjustment during operation, which, for example, is explained in further detail in the paper "Addressing Power Oscillations Damping Requirements for Wind Power Plants", 20th Wind Integration Workshop, 29-30 Sep. 2021, ISBN: 978-1-83953-681-6, by Lennart Petersen et al. An advantage of embodiments of the method is that the frequency signal can be used as input signal to the power oscillation damping controller and for the actual control while the voltage signal is used for setting the gain of the power oscillation damping controller only.

According to an advantageous embodiment of the method according to the first aspect, the method further comprises: measuring the frequency signal received as input signal to the power oscillation damping controller at the point of interest. An advantage of this embodiment is a further improved damping of power oscillation in electric power grids.

For some embodiments of the method according to the first aspect, it may be defined that the gain determines the amount of damping to be introduced. For some embodiments of the method according to the first aspect, it may be defined that the gain together with a phase shift (or a phase angle) between the input signal and the output signal of the power oscillation damping controller determine the amount of damping to be introduced.

According to an advantageous embodiment of the method according to the first aspect, the method further comprises: based on the produced output signal, controlling an injection of reactive power to the electric power grid so as to dampen power oscillation in the electric power grid. For other embodiments, the method may comprise: based on the produced output signal, controlling an injection of active power to the electric power grid so as to dampen power oscillation in the electric power grid. For some embodiments, the method may comprise: based on the produced output signal, controlling an injection of active power and of reactive power to the electric power grid so as to dampen power oscillation in the electric power grid.

According to an advantageous embodiment of the method according to the first aspect, the method further comprises: outputting a reactive power signal as output signal from the the power oscillation damping controller. For other embodiments, the method may comprise outputting an active power signal as output signal from the the power oscillation damping controller.

According to an advantageous embodiment of the method according to the first aspect, the method further comprises: measuring reactive power at the point of interest. An advantage of this embodiment is a further improved damping of power oscillation in electric power grids. For other embodiments, the method may comprise measuring active power at the point of interest. For other embodiments, the method may comprise measuring reactive and active power at the point of interest.

According to an advantageous embodiment of the method according to the first aspect, the method further comprises:
providing the produced output signal to a power plant comprising one or more renewable electric power generating units; and
based on the provided output signal, controlling an injection of electric power from the power plant to the electric power grid so as to dampen power oscillation in the electric power grid.

According to an advantageous embodiment of the method according to the first aspect, the method further comprises: based on the produced output signal, controlling an injection of electric power to the point of interest so as to dampen power oscillation in the electric power grid. An advantage of this embodiment is a further improved damping of power oscillation in electric power grids.

According to an advantageous embodiment of the method according to the first aspect, the electric power grid comprises two or more synchronous generators, wherein the electric power grid provides a corridor for an electric power flow, wherein the corridor extends from one of the two or more synchronous generators of the electric power grid to another one of the two or more synchronous generators of the electric power grid, wherein the method comprises:
based on the output signal, controlling an injection of electric power to the corridor so as to dampen power oscillation in the electric power grid.

According to an advantageous embodiment of the method according to the first aspect, the electric power grid comprises
a first bus,
a second bus,
a third bus,
a first electric power generating arrangement comprising one or more synchronous generators, and
a second electric power generating arrangement comprising one or more synchronous generators,
wherein the first bus is connected to the second bus via the third bus,
wherein the electric power grid provides a corridor for an electric power flow,
wherein the corridor extends from the first bus to the second bus via the third bus,
wherein the first electric power generating arrangement injects electric power to the corridor via the first bus,
wherein the second electric power generating arrangement injects electric power to the corridor via the second bus,
wherein the method comprises:
based on the produced output signal, controlling an injection of electric power to the third bus so as to dampen power oscillation in the electric power grid.
An advantage of this embodiment is a further improved damping of power oscillation in electric power grids.

According to an advantageous embodiment of the method according to the first aspect, the method comprises:
providing the produced output signal to a power plant comprising one or more renewable electric power generating units; and
based on the provided output signal, controlling an injection of electric power from the power plant to the corridor via the third bus so as to dampen power oscillation in the electric power grid.

According to an advantageous embodiment of the method according to the first aspect, the method further comprises: based on the provided output signal, controlling the injection of electric power from the power plant to the third bus via a fourth bus so as to dampen power oscillation in the electric power grid.

According to an advantageous embodiment of the method according to the first aspect, the point of interest is located at one of the third bus and fourth bus.

According to an advantageous embodiment of the method according to the first aspect, the point of interest is located between the third bus and one of the first bus and second bus.

According to an advantageous embodiment of the method according to the first aspect, the distance between the first bus and the third bus is different from the distance between the second bus and the third bus.

According to an advantageous embodiment of the method according to the first aspect, the distance between the first bus and the third bus exceeds the distance between the second bus and the third bus.

According to an advantageous embodiment of the method according to the first aspect, the method further comprises: before the setting of the gain of the power oscillation damping controller to be positive or negative based on the determination of which one of the filtered voltage signal and filtered frequency signal is leading or lagging in relation to the other one of the filtered voltage signal and filtered frequency signal, setting the gain of the power oscillation damping controller to an initial default gain. An advantage of this embodiment is a further improved damping of power oscillation in electric power grids. An advantage of this embodiment is that the robustness of the power oscillation damping controller is further improved.

According to an advantageous embodiment of the method according to the first aspect, the method further comprises: when or after the cease of power oscillation in the electric power grid has been determined, setting the gain of the power oscillation damping controller to the initial default gain. An advantage of this embodiment is a further improved damping of power oscillation in electric power grids. An advantage of this embodiment is that the robustness of the power oscillation damping controller is further improved.

According to an advantageous embodiment of the method according to the first aspect, the method further comprises: after the injection of electric power to the electric power grid for the damping of power oscillation in the electric power grid, if power oscillation in the electric power grid increases, setting the gain of the power oscillation damping controller to the initial default gain. An advantage of this embodiment is a further improved damping of power oscillation in electric power grids. An advantage of this embodiment is that the robustness of the power oscillation damping controller is further improved.

According to an advantageous embodiment of the method according to the first aspect, the method further comprises: after the injection of electric power to the electric power grid for the damping of power oscillation in the electric power grid, if power oscillation in the electric power grid increases, setting the gain of the power oscillation damping controller to zero. An advantage of this embodiment is a further improved method for damping of power oscillation in electric power grids. An advantage of this embodiment is that the power oscillation damping controller is prevented from contributing to a destabilization of the electric power grid. An advantage of this embodiment is that the robustness of the power oscillation damping controller is further improved.

According to an advantageous embodiment of the method according to the first aspect, the method further comprises: based on the determination of which one of the filtered voltage signal and filtered frequency signal is leading or lagging in relation to the other one of the filtered voltage signal and filtered frequency signal, if one of the filtered voltage signal and filtered frequency signal is leading or lagging in relation to the other one of the filtered voltage signal and filtered frequency signal by a degree value within a first range including zero degrees or within a second range including 180 degrees, setting the gain of the power oscillation damping controller to zero. An advantage of this embodiment is a further improved method for damping of power oscillation in electric power grids. An advantage of this embodiment is that the power oscillation damping controller is prevented from contributing to a destabilization of the electric power grid. An advantage of this embodiment is that the robustness of the power oscillation damping controller is further improved.

According to an advantageous embodiment of the method according to the first aspect, the method further comprises:
based on the determination of which one of the filtered voltage signal and filtered frequency signal is leading or lagging in relation to the other one of the filtered voltage signal and filtered frequency signal, setting the phase shift between the input signal and the output signal of the power oscillation damping controller;
applying the power oscillation damping controller with the set gain and with the set phase shift between the input signal and the output signal of the power oscillation damping controller so as to produce an output signal outputted from the power oscillation damping controller, and
based on the produced output signal, controlling an injection of electric power to the electric power grid so as to dampen power oscillation in the electric power grid.

An advantage of this embodiment is a further improved damping of power oscillation in electric power grids. An advantage of this embodiment is that the robustness of the power oscillation damping controller is further improved.

According to an advantageous embodiment of the method according to the first aspect, the method further comprises: before the setting of the phase shift between the input signal and the output signal of the power oscillation damping controller based on the determination of which one of the filtered voltage signal and filtered frequency signal is leading or lagging in relation to the other one of the filtered voltage signal and filtered frequency signal, setting the phase shift between the input signal and the output signal of the power oscillation damping controller to an initial default phase shift. An advantage of this embodiment is a further improved damping of power oscillation in electric power grids.

An advantage of this embodiment is that the robustness of the power oscillation damping controller is further improved.

According to an advantageous embodiment of the method according to the first aspect, the method further comprises: when or after the cease of power oscillation in the electric power grid has been determined, setting the phase shift between the input signal and the output signal of the power oscillation damping controller to the initial default phase shift. An advantage of this embodiment is a further improved damping of power oscillation in electric power grids. An advantage of this embodiment is that the robustness of the power oscillation damping controller is further improved.

According to an advantageous embodiment of the method according to the first aspect, the method further comprises: after the injection of electric power to the electric power grid for the damping of power oscillation in the electric power grid, if power oscillation in the electric power grid increases, setting the phase shift between the input signal and the output signal of the power oscillation damping controller to the initial default phase shift. An advantage of this embodiment is a further improved damping of power oscillation in electric power grids. An advantage of this embodiment is that the robustness of the power oscillation damping controller is further improved.

According to an advantageous embodiment of the method according to the first aspect, the method further comprises:
filtering a voltage signal associated with the electric power grid and measured at the point of interest so as to produce the filtered voltage signal; and
filtering a frequency signal associated with the electric power grid and measured at the point of interest so as to produce the filtered frequency signal.

According to an advantageous embodiment of the method according to the first aspect, the method further comprises:
measuring a voltage signal, at the point of interest, to be filtered, the voltage signal being associated with the electric power grid; and
measuring a frequency signal, at the point of interest, to be filtered, the frequency signal being associated with the electric power grid.

According to yet another advantageous embodiment of the method according to the first aspect, one or more of the one or more renewable electric power generating units comprises/comprise one or more of the group of:
a wind turbine generator;
an electric battery energy storage system;
a fuel cell; and
a photo-voltaic panel.

According to a second aspect of the invention, the above mentioned and other objects are achieved with a computer program comprising instructions which, when the program is executed by a computer, cause the computer to carry out the method according to any one of the embodiments disclosed above or below. Advantages of the computer program according to the second aspect correspond to advantages of the method according to the first aspect and its embodiments mentioned above or below.

For some embodiments, the above mentioned and other objects are achieved with a computer program comprising instructions which, when the program is executed by a computer, cause the computer to carry out the method according to any one of the embodiments mentioned above or below.

According to a third aspect of the invention, the above mentioned and other objects are achieved with a computer-readable medium comprising instructions which, when the instructions are executed by a computer, cause the computer to carry out the method according to any one of the embodiments disclosed above or below. Advantages of the computer-readable medium according to the third aspect correspond to advantages of the method according to the first aspect and its embodiments mentioned above or below.

For some embodiments, the above mentioned and other objects are achieved with a computer-readable medium comprising instructions which, when the instructions are executed by a computer, cause the computer to carry out the method according to any one of the embodiments mentioned above or below.

According to an aspect of the present invention, the above-mentioned computer program and/or the computer-readable medium are/is configured to implement the method and its embodiments described herein.

According to a fourth aspect of the invention, the above mentioned and other objects are achieved with a control arrangement for damping power oscillation in an electric power grid, wherein the control arrangement is configured to:
perform a procedure for determination of a phase shift between a filtered voltage signal and a filtered frequency signal, wherein the filtered voltage signal and the filtered frequency signal are associated with oscillation signals associated with the electric power grid and measured at a point of interest;
based on the performed procedure, determine which one of the filtered voltage signal and filtered frequency signal is leading or lagging in relation to the other one of the filtered voltage signal and filtered frequency signal;
based on the determination of which one of the filtered voltage signal and filtered frequency signal is leading or lagging in relation to the other one of the filtered voltage signal and filtered frequency signal, set a gain of a power oscillation damping controller to be positive or negative, wherein a power oscillation damping controller is configured to receive an input signal and output an output signal;
apply the power oscillation damping controller with the set gain so as to produce an output signal outputted from the power oscillation damping controller; and
based on the produced output signal, control an injection of electric power to the electric power grid so as to dampen power oscillation in the electric power grid.

Advantages of the control arrangement according to the fourth aspect correspond to advantages of the method according to the first aspect and its embodiments mentioned above or below.

It is to be appreciated that all the embodiments described for the method aspects of the invention are applicable also to the control arrangement aspects of the invention. Thus, all embodiments described for the method aspects of the invention may be performed by the control arrangement, which may include one or more controllers, control units, or control devices. As mentioned above, the embodiments of the control arrangement have advantages corresponding to advantages mentioned above for the method and its embodiments.

According to a fifth aspect of the invention, the above mentioned and other objects are achieved with a power plant for providing electric power to an electric power grid, wherein the power plant comprises
one or more renewable electric power generating units, and
a control arrangement according to any one of the embodiments disclosed above or below.

Advantages of the power plant according to the fifth aspect correspond to advantages of the method according to the first aspect and its embodiments mentioned above or below.

According to an advantageous embodiment of the power plant according to the fifth aspect, one or more of the one or more renewable electric power generating units comprises/comprise one or more of the group of:
a wind turbine generator;
an electric battery energy storage system;
a fuel cell; and
a photo-voltaic panel.

According to another advantageous embodiment of the power plant according to the fifth aspect, the power plant comprises one or more static synchronous compensators (STATCOM).

The above-mentioned features and embodiments of the method, the computer program, the computer-readable medium, the control arrangement and the power plant, respectively, may be combined in various possible ways providing further advantageous embodiments.

Further advantageous embodiments of the method, the computer program, the computer-readable medium, the control arrangement and the power plant according to the present invention and further advantages with the embodiments of the present invention emerge from the detailed description of embodiments.

BRIEF DESCRIPTION OF THE DRAWINGS

Embodiments of the invention will now be illustrated, for exemplary purposes, in more detail by way of embodiments and with reference to the enclosed drawings, where similar references are used for similar parts, in which.

DETAILED DESCRIPTION

Figure 1:
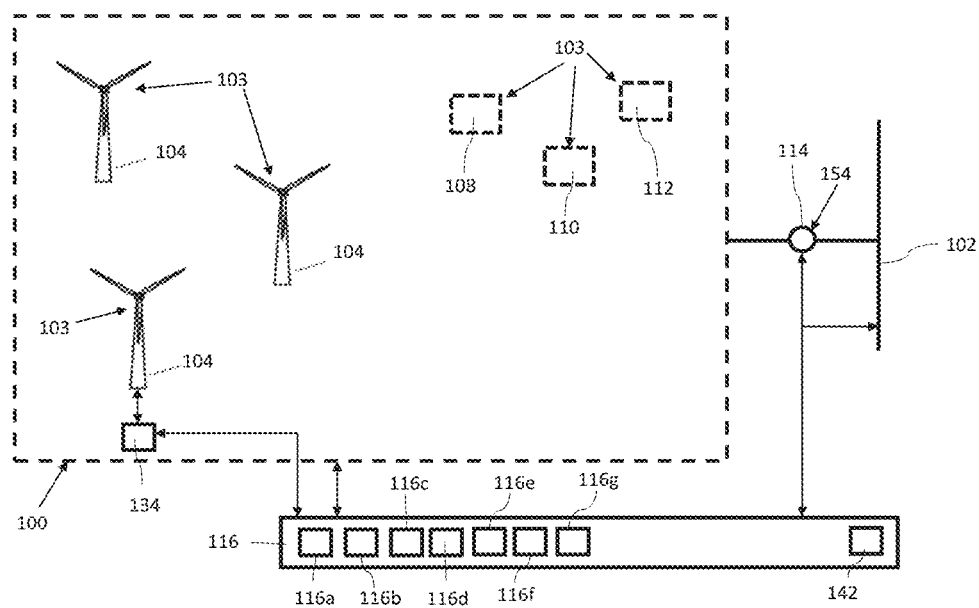
FIG. 1 is a schematic diagram illustrating embodiments of the power plant according to the fifth aspect of the invention and an electric power grid, to which embodiments of the method according to the first aspect of the invention may be applied.

With reference to FIG. 1, an embodiment of the power plant 100 for providing electric power, or electrical energy, to an electric power grid 102 according to the fifth aspect of the invention is schematically illustrated. For example, embodiments of the method according to the first aspect of the invention may be applied to the electric power grid 102 illustrated in FIG. 1. However, embodiments of the method 400 according to the first aspect may also be applied to other electric power grids. The power plant 100 includes one or more electric power generating units 103. For some embodiments, the electric power generating unit 103 may be referred to as a renewable electric power generating unit 103. For some embodiments, one or more of the one or more electric power generating units 103 may include one or more of the group of: a wind turbine generator 104; an electric battery energy storage system 112; a photo-voltaic panel 108; and a fuel cell 110. The electric battery energy storage system 112 may include one or more electric battery units. For some embodiments, the power plant 100 may include one or more additional power sources or power generators, such as one or more additional electric battery units. Thus, for some embodiments, the power plant 100 may include one or more wind turbine generators 104, for example two, three or more wind turbine generators 104. Aspects of an embodiment of the wind turbine generator 104 are disclosed in further detail hereinbelow in connection with FIG. 2. For some embodiments, the power plant 100 may include one or more static synchronous compensators (STATCOM). A static synchronous compensator may be used to inject reactive power to an electric power grid 102.

With reference to FIG. 1, for some embodiments, the wind turbine generator 104, the electric battery energy storage system 112, the photo-voltaic panel 108, or the fuel cell 110 may be described as a power source of the power plant 100 or as a power generator of the power plant 100. For some embodiments, the power plant 100 may be referred to as a hybrid power plant. The power plant 100 may be connected, or connectable, more specifically electrically connected/connectable, to the electric power grid 102 via a point of common coupling, PCC, 114. For some embodiments, the electric power grid 102 may be referred to as a utility grid, an electrical grid, or an electric power network. For example, the power plant 100 may be located offshore or on land.

With reference to FIG. 1, the power plant 100 includes a control arrangement 116 according to any one of the embodiments disclosed above or below and/or according to the fourth aspect of the invention. For some embodiments, the control arrangement 116 may be configured to control the power plant 100. For some embodiments, the control arrangement 116 may comprise, or be referred to as, a power plant controller, PPC. The control arrangement 116 is further disclosed hereinbelow.

Figure 2:
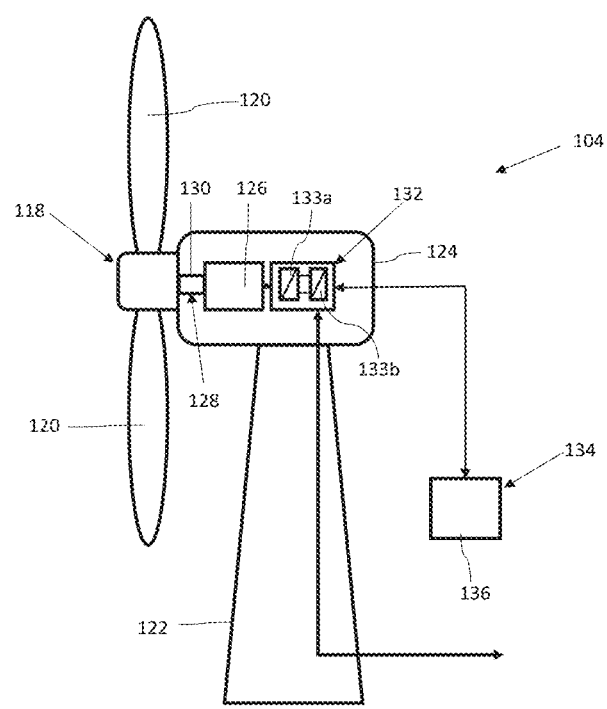
FIG. 2 is a schematic diagram illustrating an embodiment of a wind turbine generator of the power plant of FIG. 1.

With reference to FIG. 2, an embodiment of the wind turbine generator 104 of the power plant 100 of FIG. 1 is schematically illustrated. The wind turbine generator 104 may comprise a rotor 118 including one or more blades 120, or rotor blades 120, for example two or more blades 120, such as three blades 120, or more. The wind turbine generator 104 may comprise a tower 122 and a nacelle 124 mounted to the top of the tower 122. The rotor 118 may be connected, such as rotatably connected or mounted, to the nacelle 124. The wind turbine generator 104 may comprise an electric generator 126. The rotor 118 may be connected to the electric generator 126. The rotor 118 is configured to drive the electric generator 126. The electric generator 126 may be a permanent magnet, PM, generator, or any other type of electric generator. The nacelle 124 may house the electric generator 126.

With reference to FIG. 2, the rotor 118 is rotatable by action of the wind. The wind-induced rotational energy of the blades 120 and rotor 118 may be transferred via a coupling 128, for example including one or more shafts 130, to the electric generator 126. Thus, the wind turbine generator 104 may be described to be configured to convert kinetic energy of the wind to mechanical energy, or rotational energy, by way of the blades 120 and, subsequently, to electric power by way of the electric generator 126.

With reference to FIG. 2, the wind turbine generator 104 may comprise a power converter arrangement 132 for electric power conversion. The electric generator 126 may be connected, such as electrically connected, to the power converter arrangement 132. For some embodiments, the power converter arrangement 132, and/or the wind turbine generator 104, may comprise one or more power converters 133a, 133b connected, more specifically electrically connected, to the electric generator 126. The wind turbine generator 104 and/or the electric generator 126 may be connected, more specifically electrically connected, to the electric power grid 102 via said one or more power converters 133a, 133b, and/or via the power converter arrangement 132. The one or more power converters 133a, 133b may comprise a first power converter 133a for converting AC power from the electric generator 126 to DC power. The one or more power converters 133a, 133b may comprise a second power converter 133b for converting DC power from the first power converter 133a to AC power to be provided to the electric power grid 102. The nacelle 124 may house the one or more power converters 133a, 133b, or the one or more power converters 133a, 133b may be located elsewhere, such in the tower 122 or outside the wind turbine generator 104. Accordingly, the nacelle 124 may house the power converter arrangement 132, or the power converter arrangement 132 may be located elsewhere.

With reference to FIG. 2, the wind turbine generator 104 may comprise a control arrangement 134, or controller 136, for controlling the wind turbine generator 104. The control arrangement 134 of the wind turbine generator 104 may comprise the controller 136, which may be referred to as a wind turbine generator controller 136. The control arrangement 134 of the wind turbine generator 104 may be configured to communicate with and/or be connected to, or be part of, the control arrangement 116 of the power plant 100 (see FIG. 1). For some embodiments, the wind turbine generator 104 may be referred to as a variable-speed wind turbine generator. It is to be understood that the wind turbine generator 104 may include further unites, components and/or devices, such as sensors, required for a wind turbine generator 104. For example, the wind turbine generator 104 may be located offshore or on land.

Figure 3:
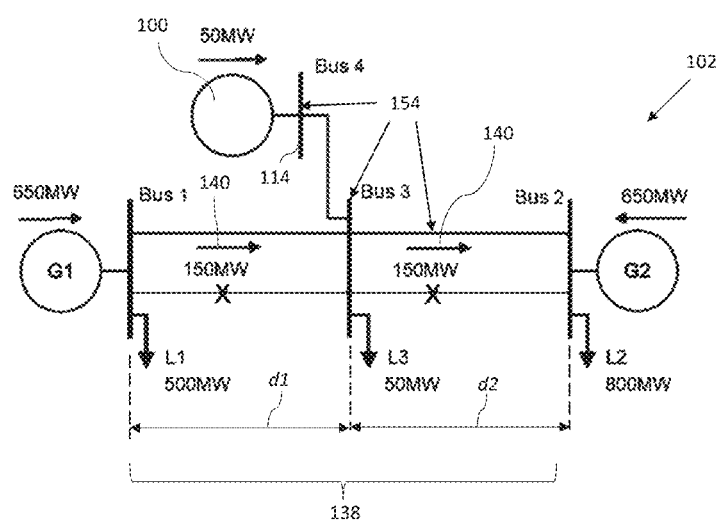
FIG. 3 is a schematic diagram illustrating an example of an electric power grid.

With reference to FIG. 3, an example of an electric power grid 102 is schematically illustrated. The electric power grid 102 may be described to include two or more synchronous generators G1, G2. The electric power grid 102 may provide a corridor 138 for an electric power flow 140. Conventionally, for example, a corridor 138 for an electric power flow may be formed by one or more power cables or power lines. The corridor 138 may be described to extend from one G1 of the two or more synchronous generators G1, G2 of the electric power grid 102 to another one G2 of the two or more synchronous generators G1, G2 of the electric power grid 102. For some electric power grids 102, the electric power grid 102 may include a first bus Bus1, a second bus Bus2, and a third bus Bus3. The electric power grid 102 may include a first electric power generating arrangement G1 comprising one or more synchronous generators. The first electric power generating arrangement G1 may be described as a first load center having a first aggregated inertia. The electric power grid 102 may include a second electric power generating arrangement G2 comprising one or more synchronous generators. The second electric power generating arrangement G2 may be described as 1 second load center having a second aggregated inertia. As illustrated in FIG. 3, the first bus Bus1 is connected, more specifically electrically connected, to the second bus Bus2 via the third bus Bus3. As already mentioned above, the electric power grid 102 may provide a corridor 138 for an electric power flow, and as illustrated in the example of FIG. 3, the corridor 138 extends from the first bus Bus1 to the second bus Bus2 via the third bus Bus3.

With reference to FIG. 3, the first electric power generating arrangement G1 injects, or is configured to inject (or provide), electric power to the corridor 138 via the first bus Bus1. It may be defined that the first electric power generating arrangement G1 is connected, more specifically electrically connected, to the first bus Bus1, or, that the first electric power generating arrangement G1 injects, or is configured to inject, electric power to the first bus Bus1. The second electric power generating arrangement G2 injects, or is configured to inject (or provide), electric power to the corridor 138 via the second bus Bus2. It may be defined that the second electric power generating arrangement G2 is connected, more specifically electrically connected, to the second bus Bus2, or, that the second electric power generating arrangement G2 injects, or is configured to inject, electric power to the second bus Bus2. A power plant 100, which is configured to provide, or inject, electric power to the electric power grid 102, may be connected or connectable, more specifically electrically connected/connectable, to the third bus Bus3 via a fourth bus Bus4, or may be connected to the electric power grid 102 in other ways. The point of common coupling, PCC, 114, may be located at the fourth bus Bus4.

With reference to FIG. 3, for some electric power grids 102, it may be defined that the distance d1, or the impedance Z1, between the first bus Bus1 and the third bus Bus3 is different from the distance d2, or the impedance Z2, between the second bus Bus2 and the third bus Bus3. For some electric power grids 102, it may be defined that the distance d1, or the impedance Z1, between the first bus Bus1 and the third bus Bus3 exceeds the distance d2, or the impedance Z2, between the second bus Bus2 and the third bus Bus3.

Figure 4:
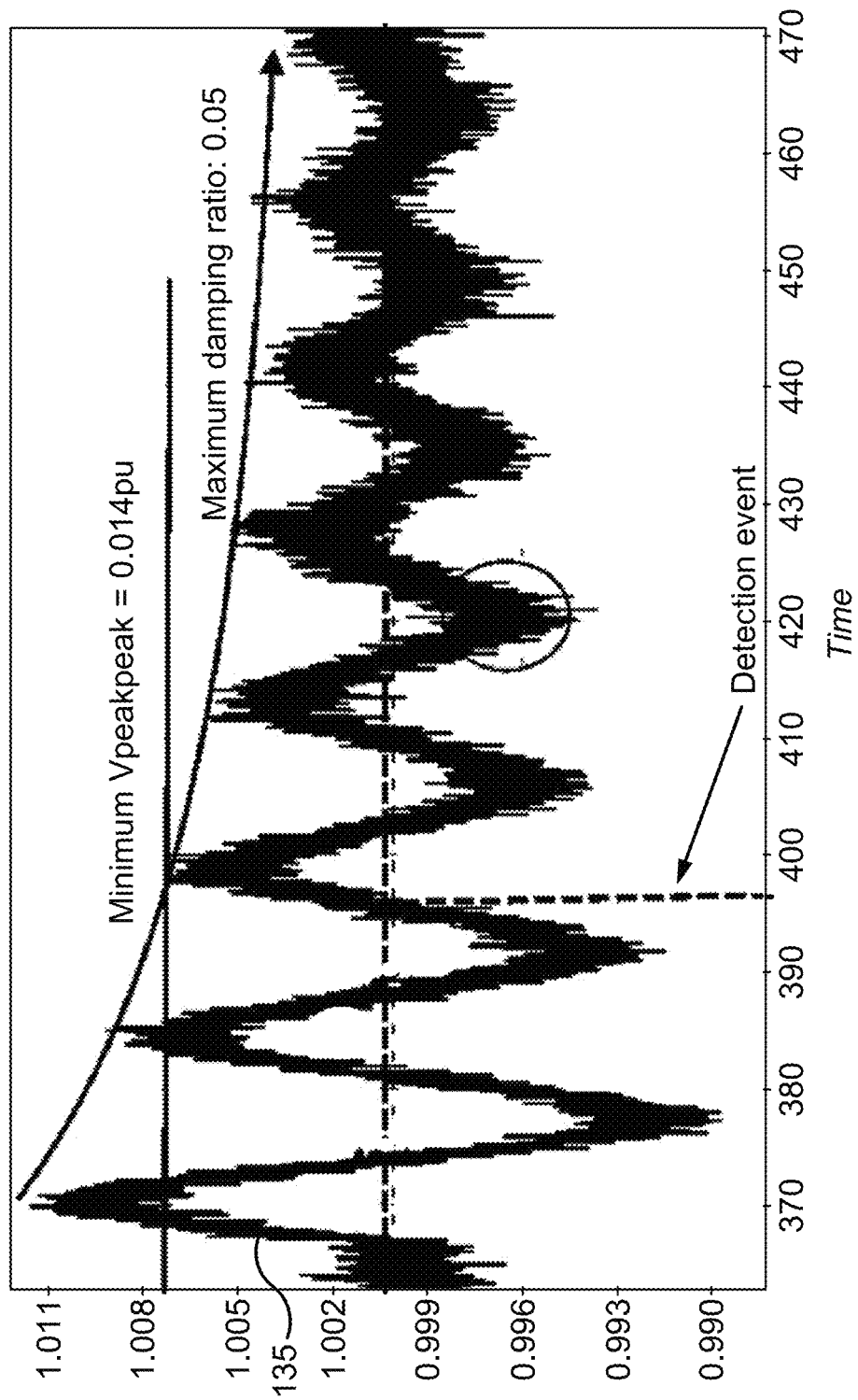
FIG. 4 is a schematic diagram including a schematic graph illustrating power oscillation in an electric power grid.

FIG. 4 shows a schematic diagram including a schematic graph illustrating power oscillation in an electric power grid 102. The wave-shaped signal 135 illustrated in FIG. 4 is associated with an electric power grid 102. More specifically, in FIG. 4, the wave-shaped signal 135 represents a signal which has been measured at a point of common coupling, PCC, 114 between the electric power grid 102 and a power plant 100 connected, more specifically electrically connected, to the electric power grid 102. In FIG. 4, the signal 135 is a voltage signal. However, in alternative schematic diagrams illustrating power oscillation, the signal 135 may be a frequency signal. However, the signal 135 could represent any measured physical magnitude or quantity, such as any electrical or mechanical signal. In FIG. 4, the signal 135 has a maximum damping rate of 0.05 and a minimum voltage$_{peak-to-peak}$ of 0.014 pu. However, for other cases, other maximum damping rates and other minimum voltages$_{peak-to-peak}$ are possible. In general, power oscillation in an electric power grid 102 results in a signal 135 having a wave shape which resembles a sine wave, or a sinusoidal wave/curve, however in general dampened over time, for example as schematically illustrated in FIG. 4.

With reference to FIG. 4, in general, the measured signal 135 may be provided by the measurement of any physical magnitude or quantity. Such a physical magnitude may comprise any relevant electrical or physical state, for example, but not restricted to, a root mean square (RMS) value of an alternating voltage, such as at a point of interest 154 and/or at the point of common coupling 114, or frequency of alternating voltage, or active power flow, or reactive power flow, or any other derived magnitude from a physical measurement.

Figure 5:
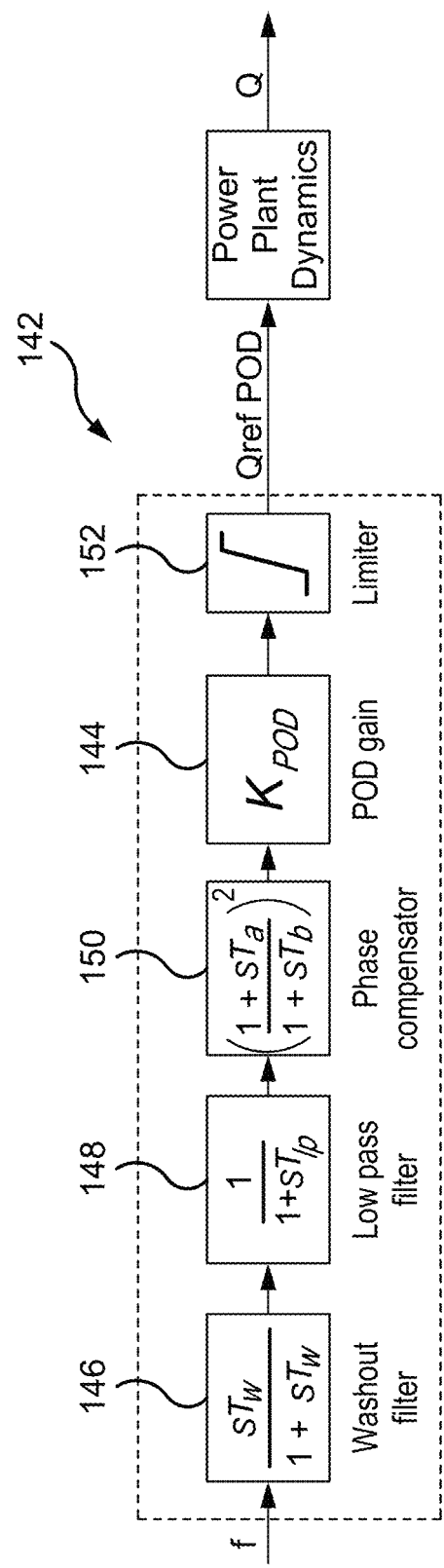
FIG. 5 is a schematic diagram illustrating an embodiment of a power oscillation damping controller.

FIG. 5 schematically illustrates an embodiment of a power oscillation damping (POD) controller 142, or POD function. In general, a power oscillation damping controller 142 may be provided as software, as a computer program executable by a computer, and/or by electronic components. Conventional power oscillation damping controllers are known to the person skilled in the art. The power oscillation damping controller 142 is configured to receive an input signal and output an output signal. In the illustrated embodiment, the power oscillation damping controller 142 is configured to receive a frequency signal f associated with the electric power grid 102 as input signal. In the illustrated embodiment, the power oscillation damping controller 142 is configured to output a reactive power signal $Q_{ref}POD$, or a reactive power reference, as output signal. However, for other embodiments, the power oscillation damping controller may be configured to receive a voltage signal v associated with the electric power grid 102 as input signal and/or to output an active power signal $P_{ref}POD$, or an active power reference, as output signal. The power oscillation damping controller 142 comprises a gain 144, or a gain block. The gain 144 may be described to determine the amount of damping to be introduced, for example introduced to the electric power grid 102. For some embodiments, the gain 144 of the power oscillation damping controller 142 may be referred to as a power oscillation damping (POD) gain 144.

With reference to FIG. 5, for some embodiments, the power oscillation damping controller 142 may comprise one or more of the group of: a washout filter 146; a low-pass filter 148; a phase compensator 150 (or a phase compensator block); and a limiter 152 (or a limiter block). The phase compensator 150 may be tuned at a desirable phase angle at the mode frequency. Conventional washout filters 146, low-pass filters 148, phase compensators 150 and limiters 152 of conventional power oscillation damping controllers are known to the person skilled in the art and thus not discussed in further detail. In general, the power oscillation damping performance of a conventional power oscillation damping controller depends primarily on the output (or actuation) of a power plant, such as the injection of electric power, for example reactive power, to the electric power grid. It may be defined that the injection of electric power (for example reactive power), inter alia, depends on the phase angle between the input signal and the output signal of the power oscillation damping controller. In general, for the embodiment of the power oscillation damping controller 142 in FIG. 5, the power oscillation damping performance of the power oscillation damping controller 142 depends primarily on the phase angle between a frequency signal f associated with the electric power grid 102, such as the grid frequency f, and a reactive power signal Q of the power plant 100. In FIG. 5, a frequency signal f is the input signal to the power oscillation damping controller 142), and a reactive power signal $Q_{ref}POD$, or a reactive power reference, is the output signal from the power oscillation damping controller 142.

With reference to FIGS. 6 and 16 to 18, aspects of embodiments of the method 400 for damping power oscillation, or power oscillations, in an electric power grid 102, for example according to any one of the examples disclosed above, according to the first aspect of the invention are schematically illustrated. For some embodiments, the electric power grid 102 may be connected, or connectable, to a power plant 100, for example according to any one of the embodiments disclosed above.

Figure 6:
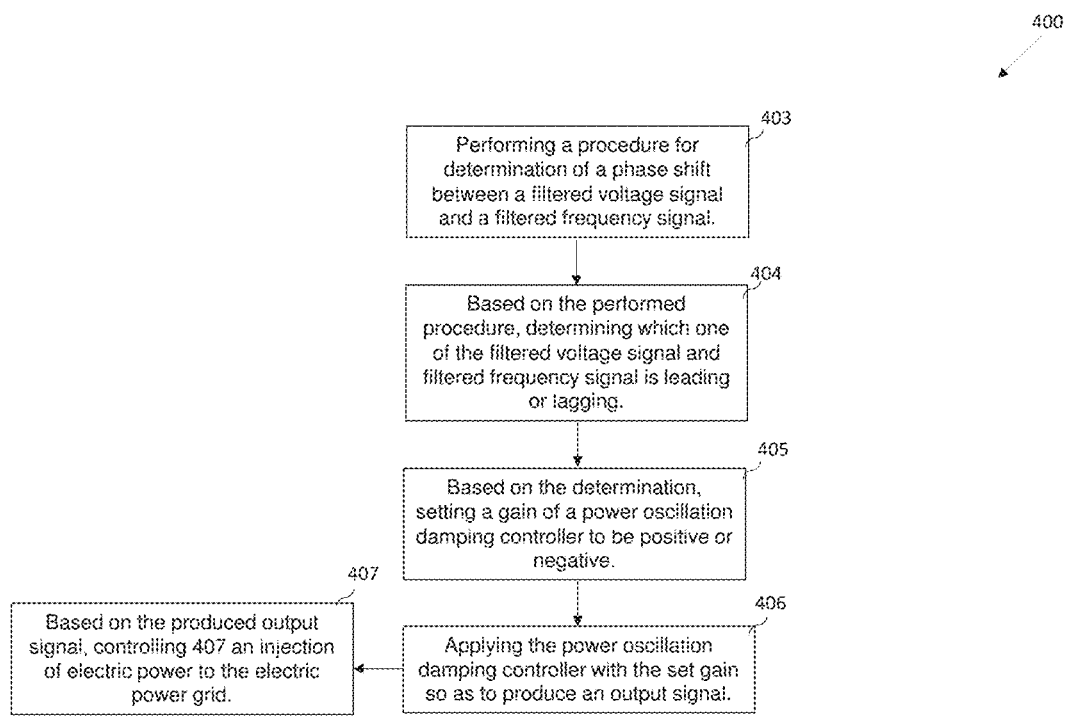
FIG. 6 is a schematic flow chart illustrating aspects of embodiments of the method according to the first aspect of the invention.

With reference to FIGS. 5 and 6, embodiments of the method 400 include the steps of:
  performing 403 a procedure for determination of a phase shift between a filtered voltage signal $V_{filtered}$ and a filtered frequency signal filtered, wherein the filtered voltage signal $V_{filtered}$ and the filtered frequency signal $f_{filtered}$ are associated with oscillation signals associated with the electric power grid 102, wherein the oscillation signals are measured at a point of interest (POI) 154;
  based on the performed procedure, determining 404 which one of the filtered voltage signal $V_{filtered}$ and filtered frequency signal filtered is leading or lagging in relation to the other one of the filtered voltage signal $V_{filtered}$ and filtered frequency signal filtered;
  based on the determination of which one of the filtered voltage signal $V_{filtered}$ and filtered frequency signal $f_{filtered}$ is leading or lagging in relation to the other one of the filtered voltage signal $V_{filtered}$ and filtered frequency signal $f_{filtered}$, setting 405 a gain 144 of a power oscillation damping controller 142 to be positive or negative, wherein a power oscillation damping controller 142 is configured to receive an input signal f and output an output signal Q;
  applying 406 the power oscillation damping controller 142 with the set gain 144 so as to produce an output signal $Q_{ref}POD$ outputted from the power oscillation damping controller 142; and
  based on the produced output signal $Q_{ref}POD$, controlling 407 an injection, for example controlling a provision, of electric power to the electric power grid 102 so as to dampen power oscillation in the electric power grid 102.

As already mentioned above, for some embodiments, the filtered voltage signal $V_{filtered}$ may represent a filtered voltage magnitude signal, for example originating from a voltage signal v, or a voltage magnitude signal (or the magnitude of a voltage signal v), measured at the point of interest 154 and thereafter filtered into the filtered voltage signal $V_{filtered}$. For some embodiments, the filtered frequency signal $f_{filtered}$ may originate from a voltage signal v and/or may represent a frequency of a voltage signal v measured at the point of interest 154, which thereafter is filtered into the filtered frequency signal filtered.

For some embodiments, power oscillation may be referred to as electromechanical oscillation of the load angle of synchronous generators, which in turn may be referred to as inter area oscillation, or intra area oscillation, occurring among synchronous machines in the electric power grid 102. Electromechanical oscillations may be described to be caused by rotor speed oscillations among synchronous generators/machines in the electric power grid 102. Such oscillations may produce extreme conditions in all electrical magnitudes, such as excessive electric currents in power lines, excessive electric power in power lines, over and under voltages, and over and under frequencies.

For some embodiments, the step of setting 405 the gain 144 may comprise one of the steps of the group of: adjusting; maintaining; changing; and inverting. For example, the step of setting 405 the gain 144 may comprise changing or inverting the sign of the gain 144 from plus minus, or from minus to plus, setting the gain 144 to plus or minus, or setting the sign of the gain 144 to plus or minus. In general, the gain 144 of a POD controller 142 can be zero, negative, or positive, but has a constant absolute value, such as a constant absolute value in the range of 0 to 100 pu. However, other ranges are possible. The gain 144 can be zero, positive, or negative depending on a setting or tuning. The absolute value of the gain 144 may be set, or preset, in view of the structure and behavior of the electric power grid 102, grid codes, the power oscillation damping controller 142, and other specific circumstances etc.

For some embodiments, the method 400 may comprise: based on the produced output signal $Q_{ref}POD$, controlling 407 an injection of reactive power to the electric power grid 102 so as to dampen power oscillation in the electric power grid 102. For some embodiments, the method 400 may comprise: based on the produced output signal, controlling 407 an injection of active power to the electric power grid 102 so as to dampen power oscillation in the electric power grid 102. For some embodiments, the method 400 may comprise: based on the produced output signal, controlling 407 an injection of reactive power and of active power to the electric power grid 102 so as to dampen power oscillation in the electric power grid 102.

For some embodiments, the procedure for determination of a phase shift between a filtered voltage signal and a filtered frequency signal may be any conventional procedure for determination of a phase shift between a filtered voltage signal and a filtered frequency signal known to the person skilled in the art. For example, for some embodiments, the procedure for determination of a phase shift between a filtered voltage signal and a filtered frequency signal may comprise one of the group of:

Prony analysis;
Wavelet coherence;
Discrete Fourier transform (DFT) analysis;
Fast Fourier transform (FFT) analysis;
Zero-crossing technique; and
Evaluation of peak values.

In general, Prony analysis, Wavelet coherence and Discrete Fourier transform analysis (such as Fast Fourier transform analysis) require data buffering, or storage, to assess measured signals over a specified time window and for several cycles. For example, in general, about ten oscillation cycles are required for the Discrete Fourier transform analysis (such as the Fast Fourier transform analysis). The advantage of Prony analysis, Wavelet coherence and Discrete Fourier transform analysis is that multiple frequency components of the signals can be detected. However, the inventors of the present invention have found that Prony analysis and Wavelet coherence may not be straight-forward to implement for the sake of phase shift determination. Zero-crossing technique and Evaluation of peak values do not require data buffering, or storage. The inventors of the present invention have found that Zero-crossing technique and Evaluation of peak values are more straight-forward to implement. However, the inventors of the present invention have found that Zero-crossing technique and Evaluation of peak values have difficulties handling multiple frequency components of the signals.

Figure 7:
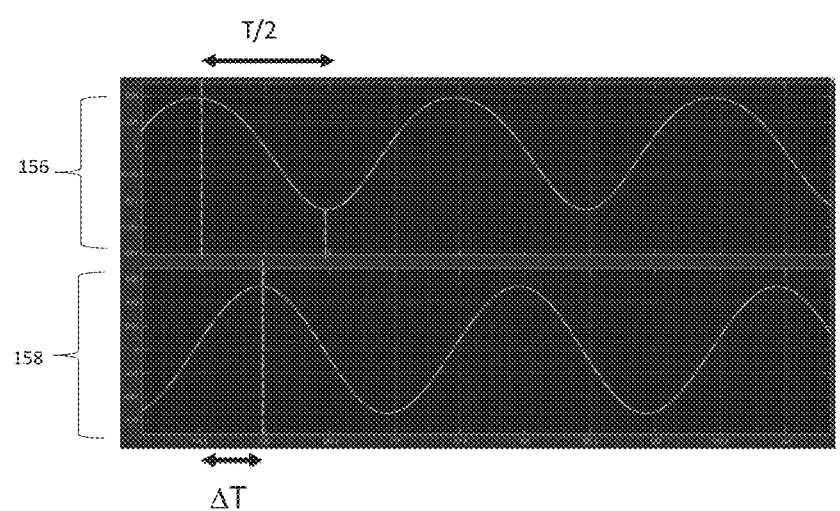
FIGS. 7 to 15 are schematic diagrams including schematic graphs illustrating aspects of embodiments of the method according to the first aspect of the invention.

With reference to FIG. 7, an example of the implementation of the procedure of Evaluation of peak values is disclosed as follows. FIG. 7 shows a filtered voltage signal 156 and a filtered frequency signal 158. The voltage signal and the frequency signal, which have been filtered, may have been measured at the point of interest 154. The procedure of Evaluation of peak values may include the steps of:

Determining peak values of oscillations in the filtered voltage signal 156 and in filtered frequency signal 158;

Determining time instants of oscillation peaks in the filtered voltage signal 156 and in filtered frequency signal 158, which are indicated by dotted vertical lines in FIG. 7;

Calculating, or determining, T/2 as time between a positive and a negative peak of the filtered voltage signal 156;

Calculating, or determining, $\Delta T$ as the time between positive peaks in the filtered voltage signal 156 and in filtered frequency signal 158; and Determining the phase shift between the filtered voltage signal 156 and the filtered frequency signal 158 as $\Delta T/T \times 360$ degrees.

Figure 8:
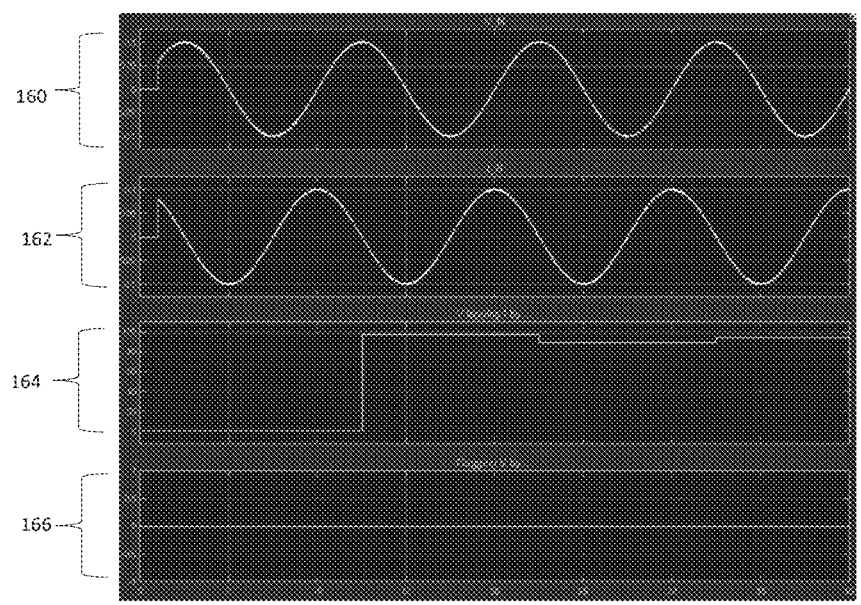
Figure 9:
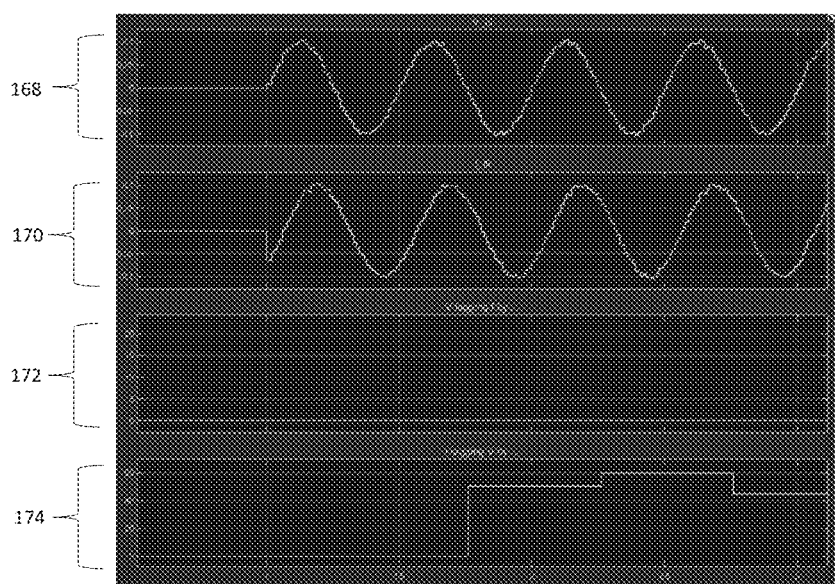
Figure 10:
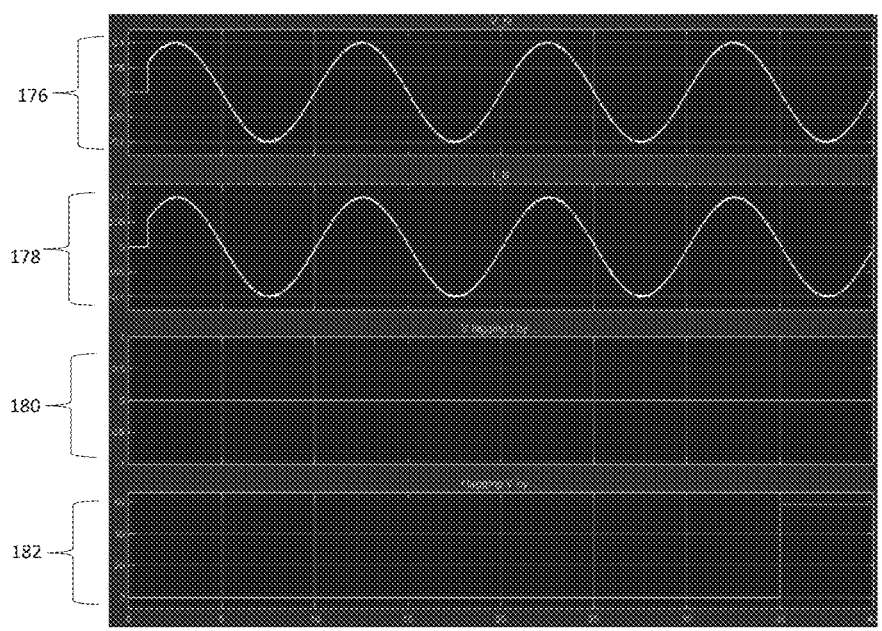

With reference to FIGS. 8 to 10, an embodiment of the procedure for determination of a phase shift between a filtered voltage signal and a filtered frequency signal implemented as a procedure of Evaluation of peak values is illustrated.

For significant phase deviations, for example more than 45 degrees, the phase shift may be determined within the first two cycles. In general, for smaller phase deviations, for example 10 degrees, more cycles are required to detect the phase shift, and the value of phase shift may not be correct. However, it displays correctly which one of the filtered voltage signal and filtered frequency signal is leading or lagging in relation to the other one of the filtered voltage signal and filtered frequency signal, which is sufficient for the embodiments of the method 400 according to the first aspect.

With reference to FIG. 8, which shows graphs of a filtered voltage signal 160 and of a filtered frequency signal 162, the filtered voltage signal 160 and the filtered frequency signal 162 are based on a voltage signal and a frequency signal, respectively, which have been filtered to capture 0.5 Hz power oscillation. More specifically, in FIG. 8, the wave-shaped signals 160, 162 may represent signals which have been measured at a point of common coupling, PCC, 114 between the electric power grid 102 and a power plant 100 connected to the electric power grid 102 and thereafter have been filtered. The point of common coupling 114 may correspond to the point of interest 154. For some embodiments, it may be defined that a voltage signal and a frequency signal associated with the electric power grid 102 are filtered into the filtered voltage signal and the filtered frequency signal, respectively, so as to capture power oscillation in the requirement range of 0.1 to 2 Hz. For other embodiments, a voltage signal and a frequency signal associated with the electric power grid 102 may be filtered into a filtered voltage signal and a filtered frequency signal 162, respectively, so as to capture power oscillation in the requirement range of 0.1 to 1 Hz, or 0.1 to 2.5 Hz, or any other range, which, for example, may be specified by the grid code for an electric power grid 102. With reference to FIG. 8, as a result of a conventional functionality when plotting the graphs of the filtered voltage signal 160 and the filtered frequency signal 162, another plotted signal 164 (or graph) shows lagging (if any) of the filtered voltage signal 160 in relation to the filtered frequency signal 162, and yet another plotted signal 166 (or graph) shows lagging (if any) of the filtered frequency signal 162 in relation to the filtered voltage signal 160. As shown in FIG. 8, the filtered voltage signal 160 is lagging in relation to the filtered frequency signal 162. More specifically, the filtered voltage signal 160 is lagging in relation to the filtered frequency signal 162 by approximately 90 degrees, which is also shown by the signal 164, which is at approximately 90 degrees, and by the signal 166, which is at zero only.

With reference to FIG. 9, which shows graphs of another filtered voltage signal 168 and of another filtered frequency signal 170, the filtered voltage signal 168 and the filtered frequency signal 170 are based on a voltage signal and a frequency signal, respectively, which have been filtered to capture 2.0 Hz power oscillation. The signal 172 (or graph) shows lagging of the filtered voltage signal 168 in relation to the filtered frequency signal 170. The signal 174 (or graph) shows lagging of the filtered frequency signal 170 in relation to the filtered voltage signal 168. As shown in FIG. 9, the filtered frequency signal 170 is lagging in relation to the filtered voltage signal 168. More specifically, the filtered frequency signal 170 is lagging in relation to the filtered voltage signal 168 by approximately 45 degrees, which is also shown by the signal 174, which is at approximately 45 degrees, and by the signal 172, which is at zero only.

With reference to FIG. 10, which shows graphs of another filtered voltage signal 176 and of another filtered frequency signal 178, the filtered voltage signal 176 and the filtered frequency signal 178 are based on a voltage signal and a frequency signal, respectively, which have been filtered to capture 0.1 Hz power oscillation. The signal 180 (or graph) shows lagging of the filtered voltage signal 176 in relation to the filtered frequency signal 178. The signal 182 (or graph) shows lagging of the filtered frequency signal 178 in relation to the filtered voltage signal 176. As shown in FIG. 10, the filtered frequency signal 178 is lagging in relation to the filtered voltage signal 176, which is also shown by the signal 180, which is at zero only. More specifically, the filtered frequency signal 178 is lagging in relation to the filtered voltage signal 176 by approximately 10 degrees.

Figure 11:
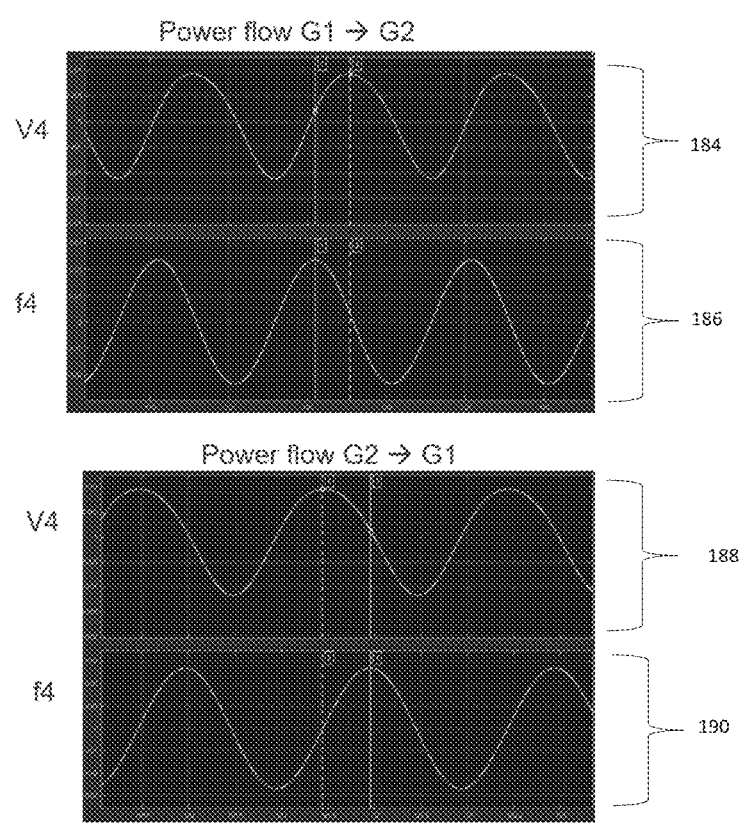

With reference to FIGS. 3 and 11, the inventors of the present invention have identified that depending on the direction of the electric power flow 140 in a corridor 136 for an electric power flow 140, to which, for example, a power plant 100 is connected, the phase shift between the frequency signal f as input signal and the reactive power signal $Q_{ref}POD$ as output signal may be required to be inverted by 180 degrees, based on an initial default phase shift, to provide effective damping. For example, reference is made to the paper "Addressing Power Oscillations Damping Requirements for Wind Power Plants", 20th Wind Integration Workshop, 29-30 Sep. 2021, ISBN: 978-1-83953-681-6, by Lennart Petersen et al. In general, if the frequency signal f as input signal and the reactive power signal $Q_{ref}POD$ as output signal must be inverted by 180 degrees, also the gain 144 of the power oscillation damping controller 142 may be needed to be inverted based on an initial default gain. The inventors of the present invention have found that the information about the direction of the electric power flow 140 can be determined based on a phase shift between a filtered voltage signal 184, 188 and a filtered frequency signal 186, 190, wherein the filtered voltage signal 184, 188 and the filtered frequency signal 186, 190 are associated with oscillation signals associated with the electric power grid 102 and measured at a point of interest 154, which may be referred to as a point of measurement. Thus, the oscillation signals are measured at a point of interest 154, which, for example, may be located at one of the third bus Bus3 and fourth bus Bus4. For some embodiments, the fourth bus Bus4 may correspond to the point of common coupling, PCC, 114, i.e., the power plant's 100 point of connection in relation to the electric power grid 102. For some embodiments, the point of interest 154 may be located between the third bus Bus3 and one of the first bus Bus1 and second bus Bus2, such as between the third bus Bus3 and the second bus Bus2, In the embodiment of FIG. 3, the distance d1 between the first bus Bus1 and the third bus Bus3 exceeds the distance d2 between the second bus Bus2 and the third bus Bus3, i.e. the distance d2 is shorter than the distance d1. Thus, in the embodiment of FIG. 3, the point point of interest 154, or the point of measurement, is located closer to the second bus Bus2 than to the first bus Bus1, or closer to G2 than G1. When the point point of interest 154, or the point of measurement, is closer to the second bus Bus2 than to the first bus Bus1, or closer to G2 than G1, the direction of the electric power flow 140 can be determined by the following expression.

$$\text{Power flow direction} = \text{sgn}(-\sin(\delta V - \delta f)) \quad [1],$$

wherein $\delta V - \delta f$ is the phase shift, or phase angle difference, between a filtered voltage signal 184, 188 and a filtered frequency signal 186, 190 associated with oscillation signals measured at the point of interest 154 and thus associated with the electric power grid 102.

With reference to FIG. 3 and the top diagram of FIG. 11 ("Power flow G143 G2"), when the "power flow direction" of the expression [1] is positive (+1), it indicates that the direction of the electric power flow 140 is from the first bus Bus1 (or from G1) to the second bus Bus2 (or to G2), which also means that the filtered voltage signal 184 is lagging in relation to the filtered frequency signal 186 and that the filtered frequency signal 186 is leading in relation to the filtered voltage signal 184, which is illustrated in the top diagram of FIG. 11.

With reference to FIG. 3 and the bottom diagram of FIG. 11 ("Power flow G2→G1"), when the "power flow direction" of the expression [1] is negative (−1), it indicates that the direction of the electric power flow 140 is from the second bus Bus2 (or from G2) to the first bus Bus1 (or to G1), which also means that the filtered voltage signal 188 is leading in relation to the filtered frequency signal 190 and that the filtered frequency signal 190 is lagging in relation to the filtered voltage signal 188, which is illustrated in the bottom diagram of FIG. 11.

Figure 12:
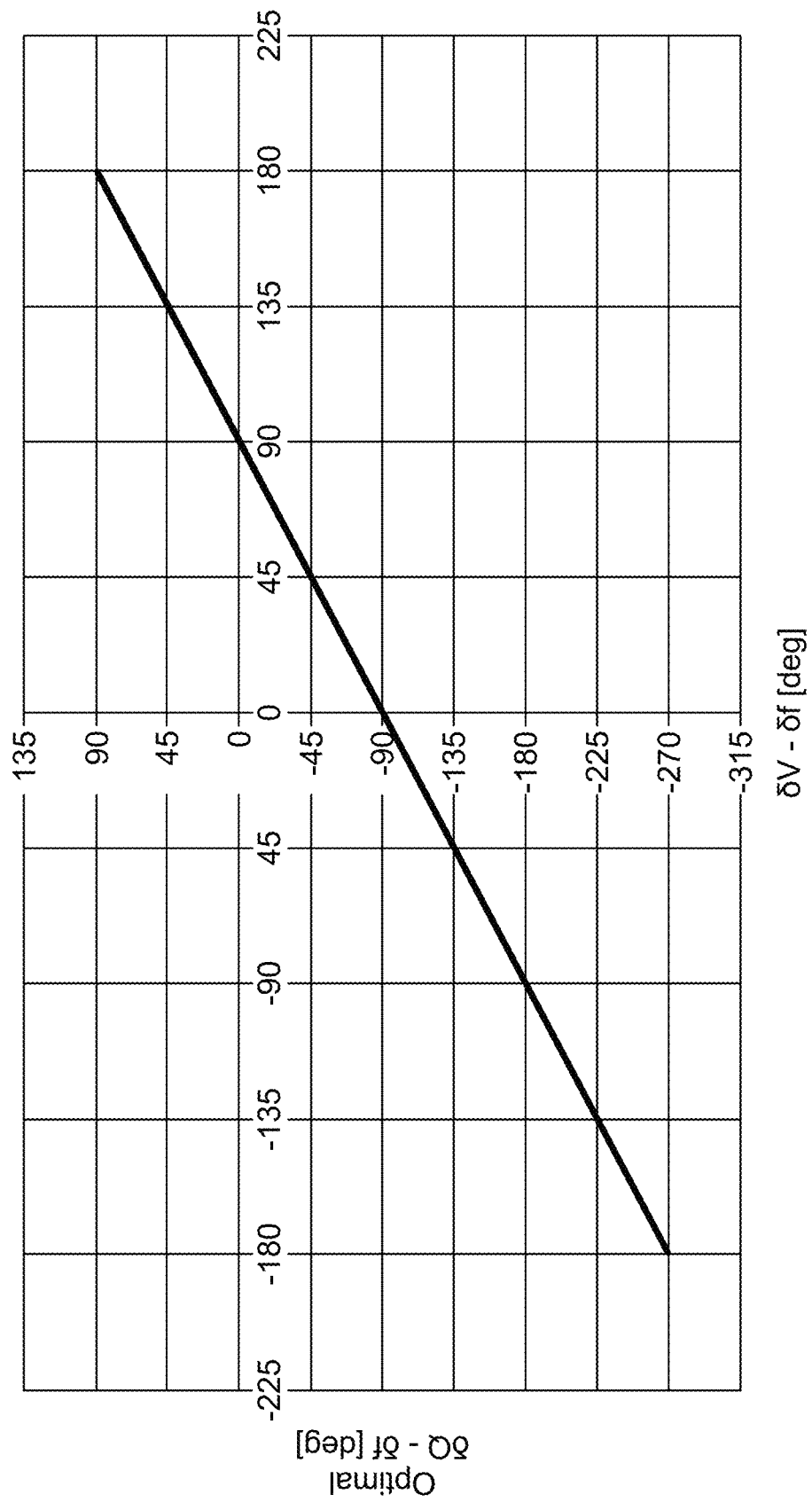

With reference to FIG. 12, in general, the phase shift ($\delta Q - \delta v$), or phase angle difference, between an input voltage signal v of a power oscillation damping controller and an output reactive power signal $Q_{ref}POD$ of the power oscillation damping controller shall be −90 degrees in order to provide optimal damping performance with regard to power oscillation. The inventors of the present invention have found that, in general, the optimal phase shift ($\delta Q - \delta f$), or phase angle difference, between an input frequency signal f of a power oscillation damping controller 142 and an output reactive power signal $Q_{ref}POD$ of the power oscillation damping controller 142 depends on the phase shift $\delta V - \delta f$, or phase angle difference, between a voltage signal and a frequency signal, more specifically, between a filtered voltage signal $V_{filtered}$ and a filtered frequency signal filtered, for example, as shown in the graph of FIG. 12. For example, with reference to FIG. 12, if the phase shift $\delta V - \delta f$, or phase angle difference, between a voltage signal and a frequency signal is −90 degrees, the optimal phase shift ($\delta Q - \delta f$) between an input frequency signal f and an output reactive power signal $Q_{ref}POD$ of the power oscillation damping controller 142 is −180 degrees. With reference to FIG. 12, if the phase shift $\delta V - \delta f$, or phase angle difference, between a voltage signal and a frequency signal, is zero degrees, the optimal phase shift ($\delta Q - \delta f$) between an input frequency signal f and an output reactive power signal $Q_{ref}POD$ of the power oscillation damping controller 142 is −90 degrees.

Figure 13:
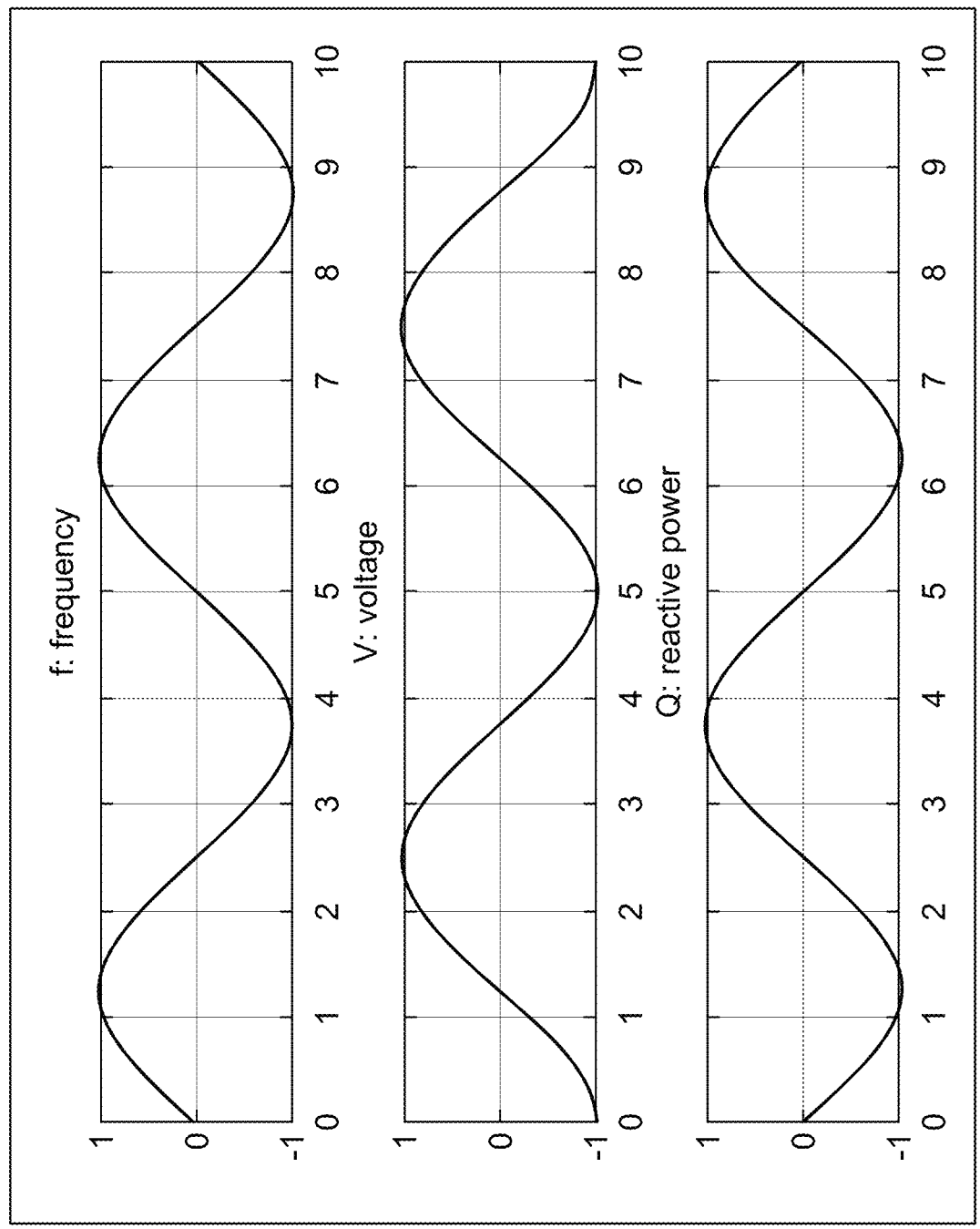
Figure 14:
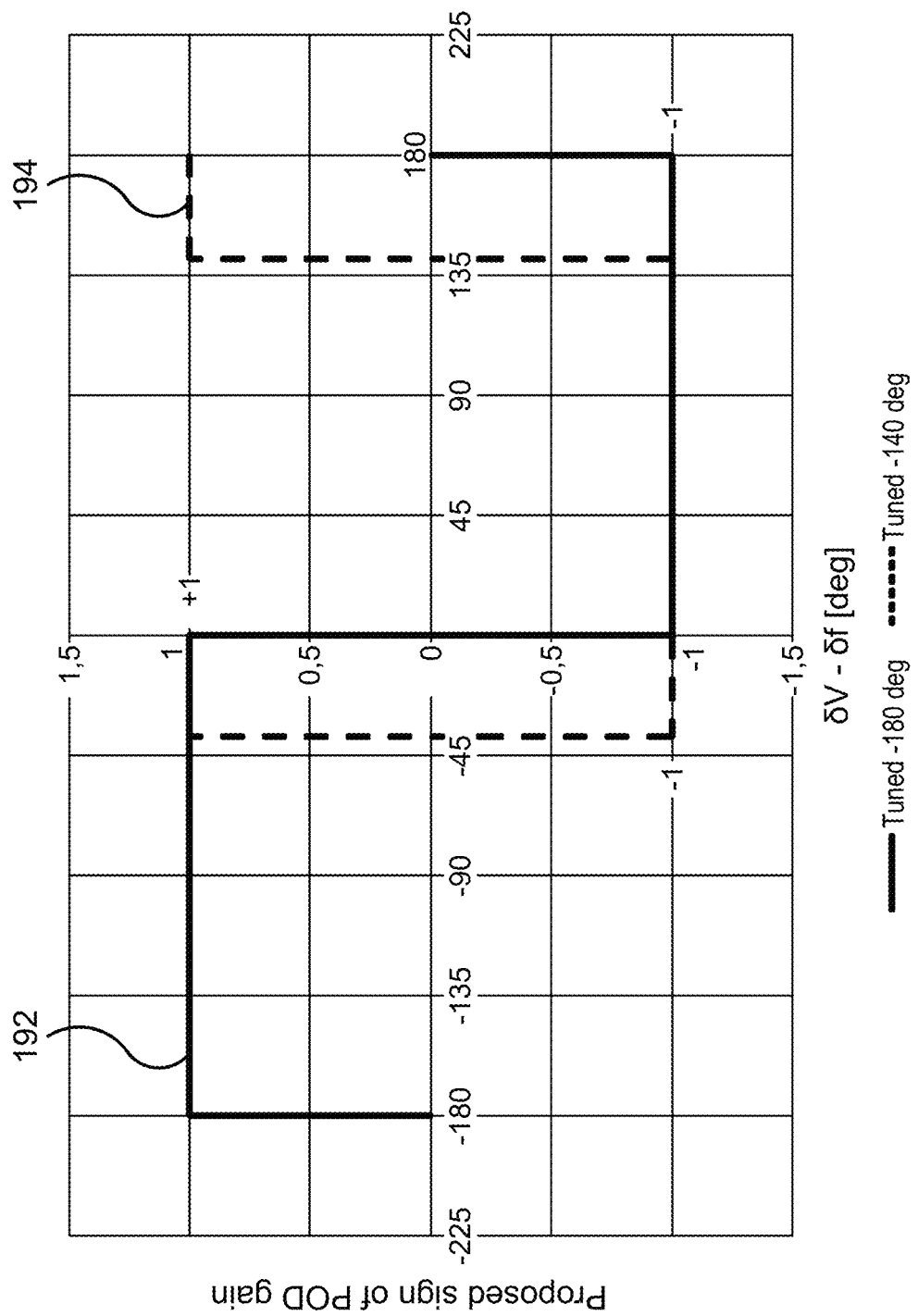

With reference to FIGS. 3, 13 and 14, assuming a determined phase shift $\delta V - \delta f$, or phase angle difference, of −90 degrees between a filtered voltage signal $V_{filtered}$ and a filtered frequency signal filtered, which gives a positive value (+1) of the the "power flow direction" of the expression [1] and accordingly indicates that the direction of the electric power flow 140 is from the first bus Bus1 (or from G1) to the second bus Bus2 (or to G2), then, with reference to FIG. 12, an optimal phase shift (δQ-δf) between an input frequency signal f and an output reactive power signal $Q_{ref}$POD of the power oscillation damping controller 142 is −180 degrees, as also shown in FIG. 13, which can be set as an initial default phase shift between the input frequency signal f and the output reactive power signal $Q_{ref}$POD of the power oscillation damping controller 142. With reference to FIG. 13, if the power oscillation damping controller 142 was initially tuned, or set, to deliver a phase shift δQ-δf between the input frequency signal f and the output reactive power signal $Q_{ref}$POD of the power oscillation damping controller 142 of −180 degrees (an initial default phase shift) for a power flow direction from first bus Bus1 (or from G1) to the second bus Bus2 (or to G2), then the sign of the gain 144 is to be set, such as adjusted, as indicated by the solid line graph 192 in FIG. 14 depending on the phase shift δV-δf between the filtered voltage signal $V_{filtered}$ and the filtered frequency signal $f_{filtered}$. With reference to FIG. 14, advantageously, when the phase shift δV-δf between the filtered voltage signal $V_{filtered}$ and the filtered frequency signal filtered is zero degrees or 180 degrees, it can be concluded that the electric power flow 140, or the direction of the electric power flow 140, is negligible and the gain 144 is thus to be set to zero.

However, with reference to FIG. 14, under some circumstances, tuning, or setting, the power oscillation damping controller 142 to deliver a phase shift δQ-δf between the input frequency signal f and the output reactive power signal $Q_{ref}$POD of −180 degrees may be valid for a specific oscillation frequency, for example 2 Hz power oscillation, but the filter and phase compensator characteristics of the power oscillation damping controller 142 may show a different phase at other oscillation frequencies, for example δQ-δf=−140 degrees at 0.1 Hz power oscillation. Under such circumstances, and for some embodiments, advantageously, the sign of the gain 144 is inverted, or set, for example from plus to minus, when the phase shift δV-δf crosses-40 degrees in order to provide appropriate damping performance, as indicated by the dotted line graph 194 in FIG. 14.

Figure 15:
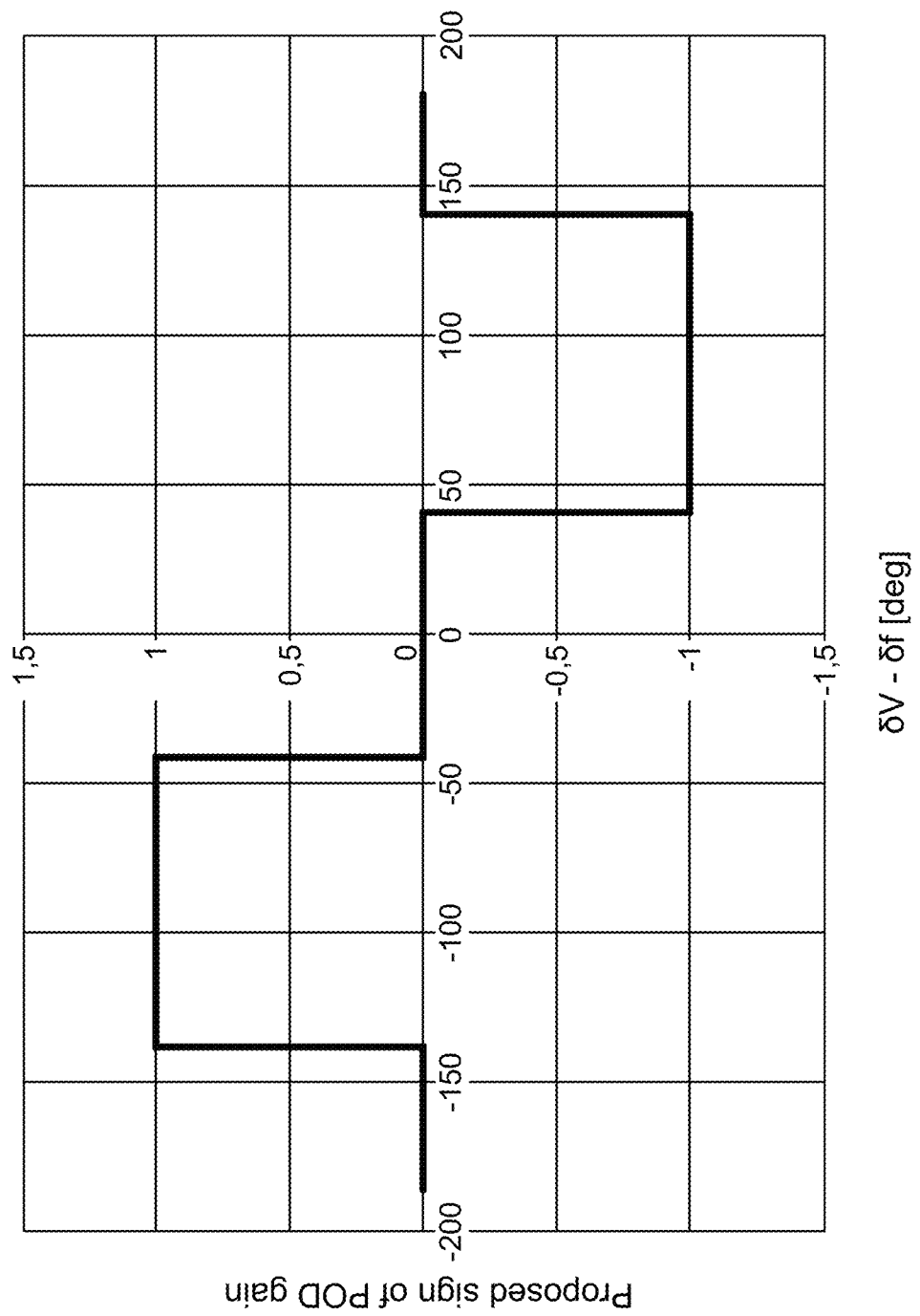

With reference to FIG. 15, for some embodiments, in order to avoid cases where the setting, or adjustment, of the gain 144 would falsely lead to an amplification, or an increase, of power oscillation, advantageously the gain 144 is to be set to zero for a tolerance band, for example a tolerance band of +45 degrees around zero degrees and around 180 degrees measured for the phase shift δV-δf, as illustrated in FIG. 15.

For some embodiments, the setting 405 of the gain 144 of the power oscillation damping controller 142 may be based on the above-mentioned expression [1], for example based on the sign of the "power flow direction" of the expression [1].

Figure 16:
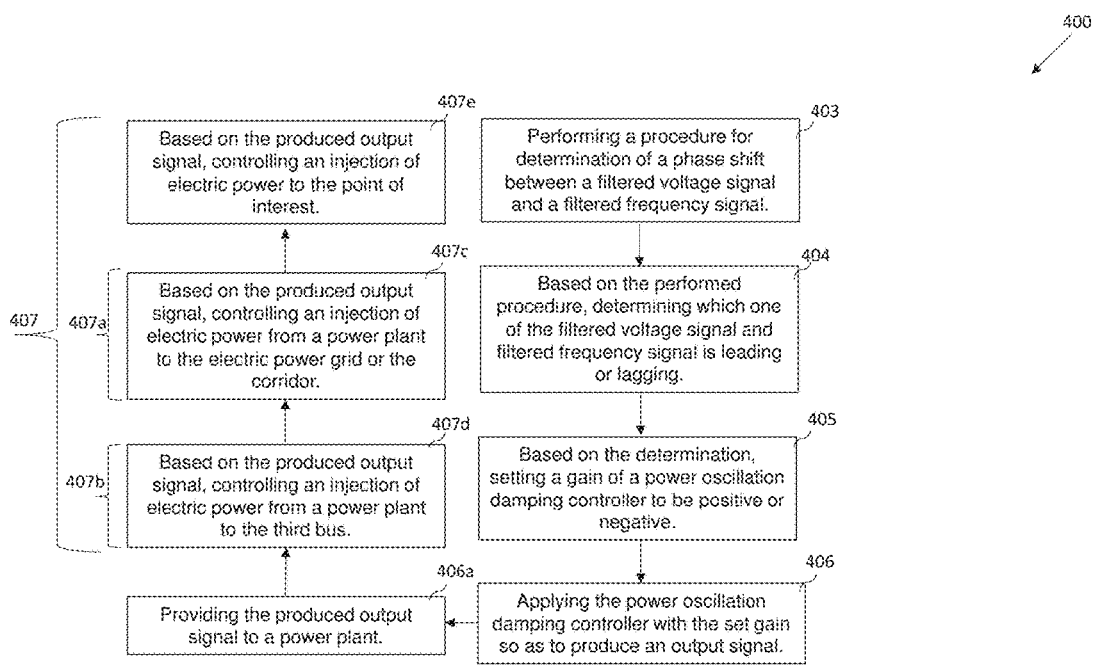
FIG. 16 is a schematic flow chart illustrating further aspects of embodiments of the method according to the first aspect of the invention.

With reference to FIGS. 3 and 16, when the electric power grid 102 comprises two or more synchronous generators G1, G2, when the electric power grid 102 provides a corridor 138 for an electric power flow 140, and when the corridor 138 extends from one G1 of the two or more synchronous generators G1, G2 of the electric power grid 102 to another one G2 of the two or more synchronous generators G1, G2, of the electric power grid 102, embodiments of the method 400 may include the step of:

Based on the output signal $Q_{ref}$POD, controlling 407a an injection of electric power to the corridor 138 so as to dampen power oscillation in the electric power grid 102.

With reference to FIGS. 3 and 16, when the electric power grid 102 comprises a first bus Bus1, a second bus Bus2, a third bus Bus3, a first electric power generating arrangement G1 comprising one or more synchronous generators, and a second electric power generating arrangement G2 comprising one or more synchronous generators, when the first bus Bus1 is connected, more specifically electrically connected, to the second bus Bus2 via the third bus Bus3, when the electric power grid 102 provides a corridor 138 for an electric power flow 140, when the corridor 138 extends from the first bus Bus1 to the second bus Bus2 via the third bus Bus3, when the first electric power generating arrangement G1 injects, or provides, electric power to the corridor 138 via the first bus Bus1, and when the second electric power generating arrangement G2 injects, or provides, electric power to the corridor 138 via the second bus Bus2, embodiments of the method 400 may include one or more of the steps of:

Providing 406a the produced output signal $Q_{ref}$POD to a power plant 100 comprising one or more renewable electric power generating units 103;

Based on the produced output signal $Q_{ref}$POD, controlling 407b an injection of electric power to the third bus Bus3 so as to dampen power oscillation in the electric power grid 102;

Based on the provided output signal $Q_{ref}$POD, controlling 407c an injection of electric power from the power plant 100 to the to the electric power grid 102 so as to dampen power oscillation in the electric power grid 102;

Based on the provided output signal $Q_{ref}$POD, controlling 407d an injection of electric power from the power plant 100 to the corridor 138 via the third bus Bus3 so as to dampen power oscillation in the electric power grid 102; and.

Based on the produced output signal $Q_{ref}$POD, controlling 407e an injection of electric power to the point of interest 154 so as to dampen power oscillation in the electric power grid 102.

With reference to FIG. 3, for some embodiments, the method 400 may further comprise:

Based on the provided output signal $Q_{ref}$POD, controlling the injection of electric power from the power plant 100 to the third bus Bus3 via a fourth bus Bus4 (see FIG. 3) so as to dampen power oscillation in the electric power grid 102.

With reference to FIG. 3, and also as already disclosed above, for some embodiments, the point of interest 154 may be located at one of the third bus Bus3 and fourth bus Bus4.

For some embodiments, the point of interest 154 may be located between the third bus Bus3 and one Bus2 of the first bus Bus1 and second bus Bus2. For some embodiments, it may be defined that the distance d1 (or the impedance Z1) between the first bus Bus1 and the third bus Bus3 is different from the distance d2 (or the impedance Z2) between the second bus Bus2 and the third bus Bus3. For some embodiments, it may be defined that the distance (or the impedance Z1) between the first bus Bus1 and the third bus Bus3 exceeds the distance (or the impedance Z2) between the second bus Bus2 and the third bus Bus3.

Figure 17:
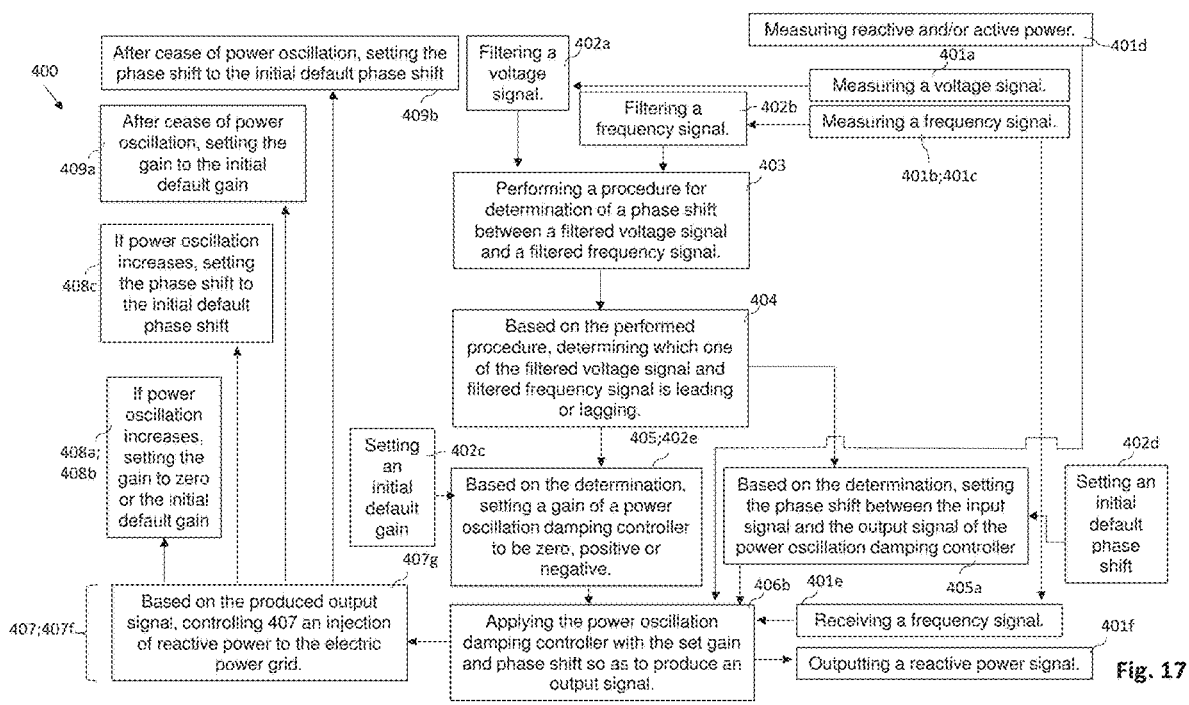
FIG. 17 is another schematic flow chart illustrating additional aspects of embodiments of the method according to the first aspect of the invention.

With reference to FIG. 17, embodiments of the method 400 may include one or more of the steps of:

- Measuring 401a a voltage signal v, at the point of interest 154, to be filtered, the voltage signal v being associated with the electric power grid 102;
- Measuring 401b a frequency signal f, at the point of interest 154, to be filtered, the frequency signal f being associated with the electric power grid 102;
- Measuring 401c a frequency signal f received as input signal to the power oscillation damping controller 142 at the point of interest 154;
- Measuring 401d reactive power Q and/or active power P at the point of interest 154;
- Receiving 401e a frequency signal f associated with the electric power grid 102 as input signal f to the power oscillation damping controller 142;
- Outputting 401f a reactive power signal $Q_{ref}POD$ (or a reactive power reference) and/or an active power signal $P_{ref}POD$ (or an active power reference) as output signal from the the power oscillation damping controller 142;
- Filtering 402a a voltage signal v associated with the electric power grid 102 and measured at the point of interest 154 so as to produce the filtered voltage signal $V_{filtered}$;
- Filtering 402b a frequency signal f associated with the electric power grid 102 and measured at the point of interest 154 so as to produce the filtered frequency signal $f_{filtered}$;
- Before setting a gain 144 of a power oscillation damping controller 142 to be positive or negative based on the determination of which one of the filtered voltage signal $V_{filtered}$ and filtered frequency signal $f_{filtered}$ is leading or lagging in relation to the other one of the filtered voltage signal $V_{filtered}$ and filtered frequency signal filtered, setting 402c the gain 144 of the power oscillation damping controller 142 to an initial default gain. The setting 402c of the initial default gain may be based on an assumption of the direction of the electric power flow 140 in the electric power grid 102 and/or in the corridor 138, wherein the assumption may be based on historical data and/or on forecasting;
- Before setting a phase shift $\delta Q - \delta f$ between the input signal f and the output signal $Q_{ref}POD$ of the power oscillation damping controller 142 based on the determination of which one of the filtered voltage signal $V_{filtered}$ and filtered frequency signal filtered is leading or lagging in relation to the other one of the filtered voltage signal $V_{filtered}$ and filtered frequency signal filtered, setting 402d the phase shift $\delta Q - \delta f$ between the input signal f and the output signal $Q_{ref}POD$ of the power oscillation damping controller 142 to an initial default phase shift. The setting 402d of the initial default phase shift may be based on an assumption of the direction of the electric power flow 140 in the electric power grid 102 and/or in the corridor 138, wherein the assumption may be based on historical data and/or on forecasting;
- Based on the determination of which one of the filtered voltage signal $V_{filtered}$ and filtered frequency signal filtered is leading or lagging in relation to the other one of the filtered voltage signal $V_{filtered}$ and filtered frequency signal filtered, if one of the filtered voltage signal $V_{filtered}$ and filtered frequency signal filtered is leading or lagging in relation to the other one of the filtered voltage signal $V_{filtered}$ and filtered frequency signal filtered by a degree value within a first range including zero degrees or within a second range including 180 degrees, setting 402e the gain 144 of the power oscillation damping controller 142 to zero. For some embodiments, the first range may be, or comprise, ±45 degrees around zero degrees while the second range may be, or comprise ±45 degrees around 180 degrees measured for the phase shift $\delta V - \delta f$;
- Based on the determination of which one of the filtered voltage signal $V_{filtered}$ and filtered frequency signal $f_{filtered}$ is leading or lagging in relation to the other one of the filtered voltage signal $V_{filtered}$ and filtered frequency signal filtered, setting 405a the phase shift $\delta Q - \delta f$ between the input signal f and the output signal $Q_{ref}POD$ of the power oscillation damping controller 142, such as inverting by 180 degrees, or maintaining; applying 406b the power oscillation damping controller 142 with the set gain 144 and with the set phase shift $\delta Q - \delta f$ between the input signal f and the output signal $Q_{ref}POD$ of the power oscillation damping controller 142 so as to produce an output signal $Q_{ref}POD$ outputted from the power oscillation damping controller 142; and based on the produced output signal $Q_{ref}POD$, controlling 407f an injection of electric power to the electric power grid 102 so as to dampen power oscillation in the electric power grid 102;
- After the injection of electric power to the electric power grid 102 for the damping of power oscillation in the electric power grid 102, if power oscillation in the electric power grid 102 increases (for example above or beyond a predetermined threshold), or is amplified, setting 408a the gain 144 of the power oscillation damping controller 142 to the initial default gain;
- After the injection of electric power to the electric power grid 102 for the damping of power oscillation in the electric power grid 102, if power oscillation in the electric power grid 102 increases (for example above or beyond a predetermined threshold), or is amplified, setting 408b the gain 144 of the power oscillation damping controller 142 to zero;
- After the injection of electric power to the electric power grid 102 for the damping of power oscillation in the electric power grid 102, if power oscillation in the electric power grid 102 increases (for example above or beyond a predetermined threshold), or is amplified, setting 408c the phase shift $\delta Q - \delta f$ between the input signal f and the output signal $Q_{ref}POD$ of the power oscillation damping controller 142 to the initial default phase shift;
- Based on the produced output signal $Q_{ref}POD$, controlling 407g an injection of reactive power Q to the electric power grid 102 so as to dampen power oscillation in the electric power grid 102. For some embodiments, the method 400 may comprise: based on the produced output signal $P_{ref}POD$, controlling an injection of active power P to the electric power grid 102 so as to dampen power oscillation in the electric power grid 102. For some embodiments, the method 400 may comprise: based on the produced output signal or signals $P_{ref}POD$, $Q_{ref}POD$, controlling an injection of active power P and of reactive power Q to the electric power grid 102 so as to dampen power oscillation in the electric power grid 102;
- When or after the cease of power oscillation in the electric power grid 102 has been determined, setting 409a the gain 144 of the power oscillation damping controller 142 to the initial default gain; and
- When or after the cease of power oscillation in the electric power grid 102 has been determined, setting 409b the phase shift δQ–δf between the input signal f and the output signal $Q_{ref}$POD of the power oscillation damping controller 142 to the initial default phase shift.

For some embodiments, it may be defined that the gain 144 of the power oscillation damping controller 142 determines the amount of damping to be introduced to the electric power grid 102. For some embodiments, it may be defined that the gain 144 together with a phase shift δQ–δf (or a phase angle) between the input signal f and the output signal $Q_{ref}$POD (or measurements and the actuation signal) of the power oscillation damping controller 142 determine the amount of damping to be introduced to the electric power grid 102. For example, the closer the phase angle is to an optimal value, for example 90 degrees lagging for voltage magnitude as measurement and reactive power as actuation, the higher the damping effect.

For some embodiments, one or more of the steps of filtering 402a and 402b may involve one or more low-pass filters, for example applied to root mean square (RMS) measurements of voltage v and grid frequency f, so as to filter away, or remove, higher frequency components not corresponding to power oscillations, for example oscillations above 2 Hz, or above 2.5 Hz. As mentioned above, for some embodiments, the filtering 402a, 402b may be performed to capture power oscillation in the requirement range of 0.1 to 1 Hz, or 0.1 to 2.5 Hz, or any other range. For some embodiments, depending on the procedure for determination of phase shift (for example zero-crossing detection techniques), one or more high-pass filters may be applied to eliminate one or more direct current (DC) components in the oscillation signal. Under some circumstances, the filtered signals will have a different phase characteristic than the unfiltered signals. However, for setting of the gain 144 of the power oscillation damping controller 142 according to embodiments of the method 400, it is enough to determine which one of the voltage oscillation and frequency oscillation is leading or lagging in relation to the other one of the voltage oscillation and frequency oscillation. The precise value of the phase shift is not required for the embodiments of the method 400 in order to set the the gain 144 of the power oscillation damping controller 142.

Figure 18:
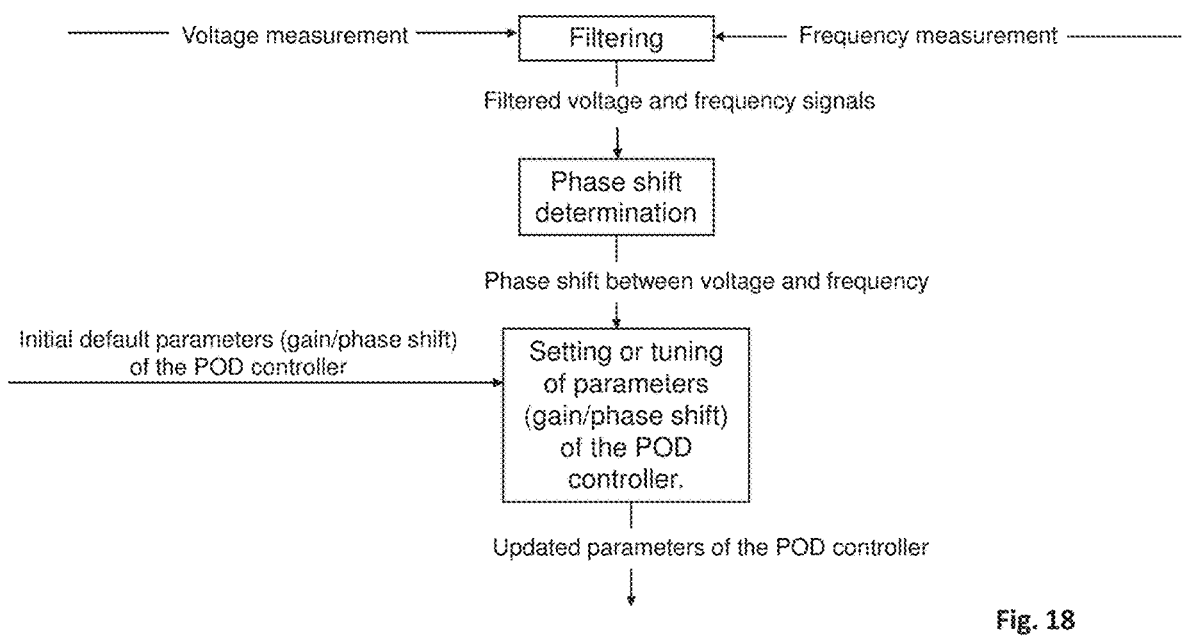
FIG. 18 is a schematic diagram illustrating general aspects of embodiments of the method according to the first aspect of the invention.

FIG. 18 shows a schematic diagram illustrating general aspects of embodiments of the method 400 according to the first aspect of the invention, applying a power oscillation damping, POD, controller 142 according to any one of the embodiments disclosed above.

With reference to FIGS. 1 and 3, for some embodiments, the method 400 may comprise detecting power oscillation, for example at the point of interest 154, such as at a point of common coupling 114 between the electric power grid 102 and a power plant 100 connected to the electric power grid 102, wherein the power plant 100 comprises one or more renewable electric power generating units 103. For some embodiments, the method 400 may comprise: based on the produced output signal $Q_{ref}$POD, and if power oscillation is detected in the electric power grid 102, controlling 407 an injection of electric power to the electric power grid 102 so as to dampen power oscillation in the electric power grid 102.

Unless disclosed otherwise, it should be noted that the method steps illustrated in FIGS. 4, 16 and 17 and described herein do not necessarily have to be executed in the order illustrated in FIGS. 4, 16 and 17. The steps may essentially be executed in any suitable order. Further, one or more steps may be added without departing from the scope of the appended claims. One or more steps may be excluded without departing from the scope of the appended claims. Method steps of the different embodiments of FIGS. 4, 16 and 17 may be combined in various ways so as to form additional embodiments.

Figure 19:
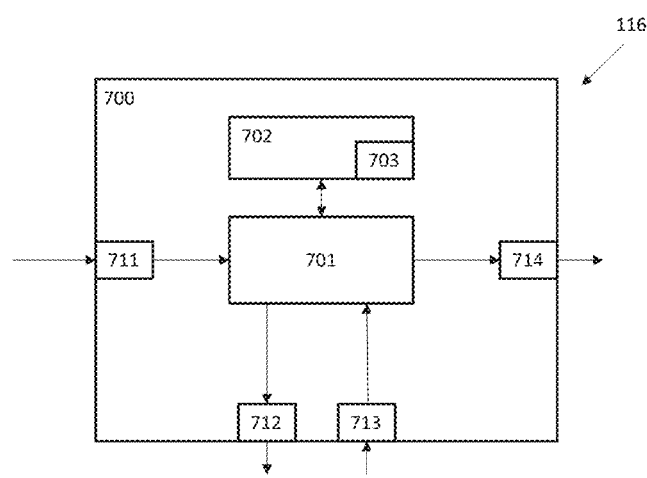
FIG. 19 is a schematic diagram illustrating an embodiment of the control arrangement according to the fourth aspect of the invention, in which a method according to any one of the herein described embodiments may be implemented.

With reference to FIGS. 1 and 19, aspects of embodiments of the control arrangement 116 for damping power oscillation in an electric power grid 102 according to the fourth aspect of the invention are schematically illustrated. Embodiments of the control arrangement 116 are configured to:

perform 403 a procedure for determination of a phase shift between a filtered voltage signal $V_{filtered}$ and a filtered frequency signal $f_{filtered}$, wherein the filtered voltage signal $V_{filtered}$ and the filtered frequency signal filtered are associated with oscillation signals associated with the electric power grid 102, wherein the oscillation signals are measured at a point of interest (POI) 154;

based on the performed procedure, determine 404 which one of the filtered voltage signal $V_{filtered}$ and filtered frequency signal filtered is leading or lagging in relation to the other one of the filtered voltage signal $V_{filtered}$ and filtered frequency signal filtered;

based on the determination of which one of the filtered voltage signal $V_{filtered}$ and filtered frequency signal filtered is leading or lagging in relation to the other one of the filtered voltage signal $V_{filtered}$ and filtered frequency signal $f_{filtered}$, set 405 a gain 144 of a power oscillation damping controller 142 to be positive or negative, wherein a power oscillation damping controller 142 is configured to receive an input signal f and output an output signal Q;

apply 406 the power oscillation damping controller 142 with the set gain 144 so as to produce an output signal $Q_{ref}$POD outputted from the power oscillation damping controller 142; and based on the produced output signal $Q_{ref}$POD, control 407 an injection, for example controlling a provision, of electric power to the electric power grid 102 so as to dampen power oscillation in the electric power grid 102.

With reference to FIG. 1, some embodiments of the control arrangement 116 may include a measuring unit 116a for the measurement of one or more of reactive power, active power, a voltage signal and a frequency signal in order to perform steps 401a, 401b, 401c and 401d in FIG. 17. The measuring unit 116a may be configured to be connected to and/or to communicate with one or more sensors or detectors for measuring or detecting reactive power, active power, a voltage signal and a frequency signal associated with the electric power grid 102, for example at a point of interest 154 such as the point of common coupling 114, or elsewhere.

With reference to FIG. 1, some embodiments of the control arrangement 116 may include a filter unit 116b for the filtering of the voltage signal and the frequency signal associated with the electric power grid 102 so as to produce a filtered voltage signal and a filtered frequency signal in order to perform steps 402 and 402b in FIG. 17. For example, the filter unit 116b may comprise a set of non-complex second order filters, or one or more other filters. For example, the filter unit 116b may comprise one or more low-pass filters and one or more high-pass filter.

With reference to FIG. 1, some embodiments of the control arrangement 116 may include a phase shift determination unit 116c for the determination of a phase shift between a filtered voltage signal and a filtered frequency signal in order to perform step 403 in FIGS. 6, 16 and 17.

With reference to FIG. 1, some embodiments of the control arrangement 116 may include a determination unit 116d for determining which one of the filtered voltage signal and filtered frequency signal is leading or lagging in relation to the other one of the filtered voltage signal and filtered frequency signal in order to perform step 404 in FIGS. 6, 16 and 17.

With reference to FIG. 1, some embodiments of the control arrangement 116 may include a setting unit 116e for setting a gain of a power oscillation damping controller 142 to be positive or negative, to zero, or to an initial default gain, and for setting the phase shift between the input signal and the output signal of the power oscillation damping controller 142, for example to an initial default phase shift in order to perform steps 402a, 402c, 402d, 405, 405a, 408a, 408b, 408c, 409a and 409b in FIGS. 6, 16 and 17.

With reference to FIG. 1, some embodiments of the control arrangement 116 may include an application unit 116f for applying the power oscillation damping controller 142 with one or more of the set gain and set phase shift between the input signal and the output signal so as to produce an output signal outputted from the power oscillation damping controller 142 in order to perform steps 406 and 406b in FIGS. 6, 16 and 17.

With reference to FIG. 1, some embodiments of the control arrangement 116 may include a controlling unit 116g for controlling an injection of electric power, such as reactive and/or active power, to the electric power grid 102 so as to dampen power oscillation in the electric power grid 102 in order to perform steps 407, 407a, 407b, 407c, 407d, 407e, 407f and 407g in FIGS. 6, 16 and 17.

With reference to FIG. 1, for some embodiments, the control arrangement 116 may comprise the power oscillation damping controller 142. For some embodiments, one or more of the units 116b-g mentioned above may be included in the power oscillation damping controller 142.

With reference to FIG. 1, for some embodiments, the control arrangement 116 is configured to directly or indirectly communicate, for example via signal lines (or cables or wires) or wirelessly, with one or more of the group of: the electric power grid 102; the power plant 100; a wind turbine generator 104; a renewable electric power generating unit 103; one or more sensors; and other devices or systems of the electric power grid 102, of the power plant 100 or of the wind turbine generator 104.

FIG. 19 shows in schematic representation an embodiment of the control arrangement 116 according to the fourth aspect of the invention, which may include a control unit 700, which may correspond to or may include one or more of the above-mentioned units 116a-g of the control arrangement 116. The control unit 700 may comprise a computing unit 701, which can be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 701 is connected to a memory unit 702 arranged in the control unit 700. The memory unit 702 provides the computing unit 701 with, for example, the stored program code and/or the stored data which the computing unit 701 requires to be able to perform computations. The computing unit 701 is also arranged to store partial or final results of computations in the memory unit 702.

With reference to FIG. 19, in addition, the control unit 700 may be provided with devices 711, 712, 713, 714 for receiving and transmitting input and output signals. These input and output signals may contain waveforms, impulses, or other attributes which, by means of the devices 711, 713 for the reception of input signals, can be detected as information and can be converted into signals which can be processed by the computing unit 701. These signals are then made available to the computing unit 701. The devices 712, 714 for the transmission of output signals are arranged to convert signals received from the computing unit 701 in order to create output signals by, for example, modulating the signals, which, for example, can be transmitted to other parts and/or systems of, or associated with, the electric power grid 102, the renewable electric power generating unit 103 and/or the power plant 100 (see FIG. 1). Each of the connections to the devices for receiving and transmitting input and output signals can be constituted by one or more of a cable; a data bus; and a wireless connection.

Here and in this document, units are often described as being provided for performing steps of the method 400 according to embodiments of the invention. This also includes that the units are designed to and/or configured to perform these method steps.

With reference to FIGS. 1, the units 116a-g of the control arrangement 116 are in FIG. 1 illustrated as separate units. These sperate units may, however, be logically separated but physically implemented in the same unit, or can be both logically and physically arranged together. The units 116a-g may for example correspond to groups of instructions, which can be in the form of programming code, that are input into, and are utilized by a processor/computing unit 701 (see FIG. 19) when the units are active and/or are utilized for performing its method step.

With reference to FIGS. 1 and 19, the control arrangement 116, which may include one or more control units 700, for example one or more devices, controllers or control devices, according to embodiments of the present invention may be arranged to perform all of the method steps mentioned above, in the claims, and in connection with the herein described embodiments. The control arrangement 116 is associated with the above-described advantages for each respective embodiment of the method 400.

With reference to FIG. 19, according to the second aspect of the invention, a computer program 703 is provided, comprising instructions which, when the program is executed by a computer, cause the computer to carry out the method 400 according to any one of the embodiments disclosed above. For some embodiments, a computer program 703 is provided, comprising instructions which, when the program is executed by a computer, cause the computer to carry out the method 400 according to any one of the embodiments disclosed above.

According to the third aspect of the invention, a computer-readable medium is provided, comprising instructions which, when the instructions are executed by a computer, cause the computer to carry out the method 400 according to any one of the embodiments disclosed above. For some embodiments, a computer-readable medium is provided, comprising instructions which, when the instructions are executed by a computer, cause the computer to carry out the method 400 according to any one of the embodiments disclosed above.

The person skilled in the art will appreciate that the herein described embodiments of the method 400 according to the first aspect may be implemented in a computer program 703 (see FIG. 19), which, when it is executed in a computer, instructs the computer to execute the method 400. The computer program is usually constituted by a computer program product 703 stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

According to the fifth aspect of the invention, a power plant 100 for providing electric power to an electric power grid 102 is provided, wherein the power plant 100 comprises one or more renewable electric power generating units 103 and a control arrangement 116 according to any one of the embodiments disclosed above.

The present invention is not limited to the above-described embodiments. Instead, the present invention relates to, and encompasses all different embodiments being included within the scope of the independent claims.

The invention claimed is:

1. A method for damping power oscillation in an electric power grid, wherein the method comprises:
performing a procedure for determination of a phase shift between a filtered voltage signal and a filtered frequency signal, wherein the filtered voltage signal and the filtered frequency signal are associated with oscillation signals associated with the electric power grid and measured at a point of interest;
based on the performed procedure, determining which one of the filtered voltage signal and filtered frequency signal is leading or lagging in relation to the other one of the filtered voltage signal and filtered frequency signal;
based on the determination of which one of the filtered voltage signal and filtered frequency signal is leading or lagging in relation to the other one of the filtered voltage signal and filtered frequency signal, setting a gain of a power oscillation damping controller to be positive or negative, wherein the power oscillation damping controller is configured to receive an input and output an output;
applying the power oscillation damping controller with the set gain so as to produce an output signal outputted from the power oscillation damping controller; and
based on the produced output signal, controlling an injection of electric power to the electric power grid so as to dampen power oscillation in the electric power grid.

2. The method according to claim 1, wherein the method further comprises:
receiving a frequency signal associated with the electric power grid as the input to the power oscillation damping controller.

3. The method according to claim 1, wherein the method further comprises:
based on the produced output signal, controlling an injection of reactive power to the electric power grid so as to dampen power oscillation in the electric power grid.

4. The method according to claim 1, wherein the method further comprises:
outputting a reactive power signal as the output from the power oscillation damping controller.

5. The method according to claim 1, wherein the method further comprises:
providing the produced output signal to a power plant comprising one or more renewable electric power generating units; and
based on the provided output signal, controlling an injection of electric power from the power plant to the electric power grid so as to dampen power oscillation in the electric power grid.

6. The method according to claim 1, wherein the electric power grid comprises two or more synchronous generators,
wherein the electric power grid provides a corridor for an electric power flow,
wherein the corridor extends from one of the two or more synchronous generators of the electric power grid to another one of the two or more synchronous generators of the electric power grid,
wherein the method comprises:
based on the output signal, controlling an injection of electric power to the corridor so as to dampen power oscillation in the electric power grid.

7. The method according to claim 1, wherein the electric power grid comprises
a first bus,
a second bus,
a third bus,
a first electric power generating arrangement comprising one or more synchronous generators, and
a second electric power generating arrangement comprising one or more synchronous generators,
wherein the first bus is connected to the second bus via the third bus,
wherein the electric power grid provides a corridor for an electric power flow,
wherein the corridor extends from the first bus to the second bus via the third bus,
wherein the first electric power generating arrangement injects electric power to the corridor via the first bus,
wherein the second electric power generating arrangement injects electric power to the corridor via the second bus,
wherein the method comprises:
based on the produced output signal, controlling an injection of electric power to the third bus so as to dampen power oscillation in the electric power grid.

8. The method according to claim 7, wherein the method comprises:
providing the produced output signal to a power plant comprising one or more renewable electric power generating units; and
based on the provided output signal, controlling an injection of electric power from the power plant to the corridor via the third bus so as to dampen power oscillation in the electric power grid.

9. The method according to claim 1, wherein the method further comprises:
before the setting of the gain of the power oscillation damping controller to be positive or negative based on the determination of which one of the filtered voltage signal and filtered frequency signal is leading or lagging in relation to the other one of the filtered voltage signal and filtered frequency signal, setting the gain of the power oscillation damping controller to an initial default gain.

10. The method according to claim 9, wherein the method further comprises:
after the injection of electric power to the electric power grid for the damping of power oscillation in the electric power grid, if power oscillation in the electric power grid increases, setting the gain of the power oscillation damping controller to the initial default gain.

11. The method according to claim 1, wherein the method further comprises:
- after the injection of electric power to the electric power grid for the damping of power oscillation in the electric power grid, if power oscillation in the electric power grid increases, setting the gain of the power oscillation damping controller to zero.

12. The method according to claim 1, wherein the method further comprises:
- based on the determination of which one of the filtered voltage signal and filtered frequency signal is leading or lagging in relation to the other one of the filtered voltage signal and filtered frequency signal, setting the phase shift between the input and the output of the power oscillation damping controller;
- applying the power oscillation damping controller with the set gain and with the set phase shift between the input and the output of the power oscillation damping controller so as to produce a second output signal outputted from the power oscillation damping controller; and
- based on the produced second output signal, controlling an injection of electric power to the electric power grid so as to dampen power oscillation in the electric power grid.

13. A non-transitory computer-readable medium comprising instructions which, when the instructions are executed by a computer, cause the computer to carry out an operation for damping power oscillation in an electric power grid, comprising:
- performing a procedure for determination of a phase shift between a filtered voltage signal and a filtered frequency signal wherein the filtered voltage signal and the filtered frequency signal are associated with oscillation signals associated with the electric power grid and measured at a point of interest;
- based on the performed procedure, determining which one of the filtered voltage signal and filtered frequency signal is leading or lagging in relation to the other one of the filtered voltage signal and filtered frequency signal;
- based on the determination of which one of the filtered voltage signal and filtered frequency signal is leading or lagging in relation to the other one of the filtered voltage signal and filtered frequency signal, setting a gain of a power oscillation damping controller to be positive or negative, wherein the power oscillation damping controller is configured to receive an input and output an output;
- applying the power oscillation damping controller with the set gain so as to produce an output signal outputted from the power oscillation damping controller; and
- based on the produced output signal, controlling an injection of electric power to the electric power grid so as to dampen power oscillation in the electric power grid.

14. A control arrangement for damping power oscillation in an electric power grid, wherein the control arrangement is configured to:
- perform a procedure for determination of a phase shift between a filtered voltage signal and a filtered frequency signal, wherein the filtered voltage signal and the filtered frequency signal are associated with oscillation signals associated with the electric power grid and measured at a point of interest;
- based on the performed procedure, determine which one of the filtered voltage signal and filtered frequency signal is leading or lagging in relation to the other one of the filtered voltage signal and filtered frequency signal;
- based on the determination of which one of the filtered voltage signal and filtered frequency signal is leading or lagging in relation to the other one of the filtered voltage signal and filtered frequency signal, set a gain of a power oscillation damping controller to be positive or negative, wherein the power oscillation damping controller is configured to receive an input and output an output;
- apply the power oscillation damping controller with the set gain so as to produce an output signal outputted from the power oscillation damping controller; and
- based on the produced output signal, control an injection of electric power to the electric power grid so as to dampen power oscillation in the electric power grid.

15. A power plant for providing electric power to an electric power grid, wherein the power plant comprises
- one or more renewable electric power generating units, and
- a control arrangement according to claim 14.

* * * * *